(12) United States Patent
Inada

(10) Patent No.: US 8,423,330 B2
(45) Date of Patent: Apr. 16, 2013

(54) METHOD FOR RECORDING DATA WHICH VARIES WITH TIME IN SPACE CONSTITUTED BY DIMENSIONAL AXES

(75) Inventor: Yoshie Inada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 255 days.

(21) Appl. No.: 12/715,926

(22) Filed: Mar. 2, 2010

(65) Prior Publication Data
US 2010/0161624 A1 Jun. 24, 2010

Related U.S. Application Data

(63) Continuation of application No. PCT/JP2007/067178, filed on Sep. 4, 2007.

(51) Int. Cl.
| | |
|---|---|
| G06F 17/50 | (2006.01) |
| G06F 7/60 | (2006.01) |
| G06F 7/00 | (2006.01) |
| G06F 17/00 | (2006.01) |
| G06G 7/48 | (2006.01) |
| G06T 15/00 | (2011.01) |
| G09G 5/00 | (2006.01) |

(52) U.S. Cl.
USPC ........ 703/2; 703/1; 703/6; 707/754; 345/418; 345/419; 345/652

(58) Field of Classification Search .................. 703/1, 2, 703/6; 707/754; 345/418, 419, 652, 417
See application file for complete search history.

(56) References Cited

U.S. PATENT DOCUMENTS

| | | | | |
|---|---|---|---|---|
| 6,021,229 | A * | 2/2000 | Takashima et al. | 382/285 |
| 6,169,552 | B1 * | 1/2001 | Endo et al. | 345/427 |
| 6,483,507 | B2 * | 11/2002 | Osborne et al. | 345/419 |
| 6,680,735 | B1 * | 1/2004 | Seiler et al. | 345/424 |
| 6,889,177 | B1 * | 5/2005 | Runnels | 703/2 |
| 6,897,859 | B2 * | 5/2005 | Ohta | 345/419 |
| 7,990,385 | B2 * | 8/2011 | Kake et al. | 345/473 |

FOREIGN PATENT DOCUMENTS

| | | |
|---|---|---|
| JP | 09-101276 | 4/1997 |
| JP | 2000-206105 | 7/2000 |

(Continued)

OTHER PUBLICATIONS

Kozo Fujii: "Basic study on support system for creative numerical simulation, Study on creativeness supporting with fusion between numerical simulation and CAD, Study on post-processing system of numerical simulation for creativeness supporting, Basic Study on Creativeness Supporting in Intelligent Manufacturing Activity (Stage 2 Helsel 7 Nendo—Nendo);" Science and Technology Agency, Research and Development Bureau, pp. 236 to 244, Mar. 1998.

*Primary Examiner* — Omar Fernandez Rivas
*Assistant Examiner* — Nithya J Moll
(74) *Attorney, Agent, or Firm* — Fujitsu Patent Center

(57) ABSTRACT

The data acquisition unit acquires data in correspondence with each dimensional axis and the time axis. The mode setting unit makes setting and clearing of a dimensionality investigation mode. In the dimensionality investigation mode, the axis-determinative variation-rate calculation unit calculates axial data variation rates. The axis determination unit determines whether or not the axial data variation rate corresponding to each axis is low. The objective-axis setting unit sets each axis as an objective axis when the axial data variation rate corresponding to the axis is determined to be high. While the dimensionality investigation mode is cleared, the recording-determinative variation-rate calculation unit calculates axial data variation rates. The recording determination unit determines, on the basis of the axial data variation rate, whether to record the acquired data. The recording unit does not record the data when the data is determined not to be recorded.

15 Claims, 15 Drawing Sheets

FOREIGN PATENT DOCUMENTS

| | | |
|---|---|---|
| JP | 2000-331187 | 11/2000 |
| JP | 2003-075205 | 3/2003 |
| JP | 2003-301740 | 10/2003 |
| JP | 2007-133455 | 5/2007 |

* cited by examiner

FIG. 4

| NAME OF PARAMETER | VALUE |
|---|---|
| NUMBER (N) OF STEPS FOR DIMENSIONALITY INVESTIGATION | 20 |
| NUMBER (NS) OF STEPS FOR CALCULATION OF VARIATION RATES | 100 |
| THRESHOLDS FOR DIMENSIONAL AXES (Tx,Ty,Tz,Tt) | 0.8,0.5,0.3,0.6 |
| CONDITION FOR DETERMINATION | AND |
| DESIGNATED AXES | Y,Z |

FIG. 7

| TIME | X-AXIS | Y-AXIS | Z-AXIS | OUTPUT | |
|---|---|---|---|---|---|
| 1 | 0 | 0 | 0 | 1.7 | 915a |
| | 0 | 0 | 1 | 2.2 | 915b |
| | 0 | 0 | 2 | 2.6 | 915c |
| ⋮ | ⋮ | ⋮ | ⋮ | ⋮ | |
| | 0 | 1 | 0 | 1.7 | 915d |
| | 0 | 1 | 1 | 2.2 | 915e |
| | 0 | 1 | 2 | 2.5 | 915f |
| ⋮ | ⋮ | ⋮ | ⋮ | ⋮ | |
| | 1 | 0 | 0 | 1.8 | 915g |
| | 1 | 0 | 1 | 2.3 | 915h |
| | 1 | 0 | 2 | 2.7 | 915j |
| ⋮ | ⋮ | ⋮ | ⋮ | ⋮ | |
| 2 | 0 | 0 | 0 | 1.9 | 915k |
| | 0 | 0 | 1 | 2.1 | 915m |
| | 0 | 0 | 2 | 2.6 | 915p |
| ⋮ | ⋮ | ⋮ | ⋮ | ⋮ | |
| 911 | 912 | 913 | 914 | 915 | |

| TIME | X-AXIS | Y-AXIS | Z-AXIS | OUTPUT | |
|---|---|---|---|---|---|
| 1 | 0 | 0 | 0 | 0.8 | 925a |
| | 0 | 0 | 1 | 1.2 | 925b |
| | 0 | 0 | 2 | 1.6 | 925c |
| ⋮ | ⋮ | ⋮ | ⋮ | ⋮ | |
| | 0 | 1 | 0 | 1.2 | 925d |
| | 0 | 1 | 1 | 1.8 | 925e |
| | 0 | 1 | 2 | 2.4 | 925f |
| ⋮ | ⋮ | ⋮ | ⋮ | ⋮ | |
| | 1 | 0 | 0 | 0.8 | 925g |
| | 1 | 0 | 1 | 1.3 | 925h |
| | 1 | 0 | 2 | 1.7 | 925j |
| ⋮ | ⋮ | ⋮ | ⋮ | ⋮ | |
| 2 | 0 | 0 | 0 | 0.9 | 925k |
| | 0 | 0 | 1 | 1.1 | 925m |
| | 0 | 0 | 2 | 1.6 | 925p |
| ⋮ | ⋮ | ⋮ | ⋮ | ⋮ | |

| TIME | X-AXIS | Y-AXIS | Z-AXIS | OUT-PUT | |
|---|---|---|---|---|---|
| 1 | 0 | 0 | 0 | 1.7 | 935a |
|  | 0 | 0 | 1 | 0.5 | 935b |
|  | 0 | 0 | 2 | 1.3 | 935c |
| ⋮ | ⋮ | ⋮ | ⋮ | ⋮ | |
|  | 0 | 1 | 0 | 0.8 | 935d |
|  | 0 | 1 | 1 | 1.4 | 935e |
|  | 0 | 1 | 2 | 2.7 | 935f |
| ⋮ | ⋮ | ⋮ | ⋮ | ⋮ | |
|  | 1 | 0 | 0 | 2.3 | 935g |
|  | 1 | 0 | 1 | 2.4 | 935h |
|  | 1 | 0 | 2 | 0.6 | 935j |
| ⋮ | ⋮ | ⋮ | ⋮ | ⋮ | |
| 2 | 0 | 0 | 0 | 0.1 | 935k |
|  | 0 | 0 | 1 | 1.4 | 935m |
|  | 0 | 0 | 2 | 3.8 | 935p |
| ⋮ | ⋮ | ⋮ | ⋮ | ⋮ | |
| 931 | 932 | 933 | 934 | 935 | |

930

METHOD FOR RECORDING DATA WHICH VARIES WITH TIME IN SPACE CONSTITUTED BY DIMENSIONAL AXES

This application is a continuing application, filed under 35 U.S.C. §111(a), of International Application PCT/JP2007/067178, filed Sep. 4, 2007.

FIELD

The embodiment discussed herein is related to a data recording program, a data recording apparatus, and a data recording process.

BACKGROUND

In large-scale simulations such as molecular simulation and global warming simulation, one or more physical quantities are calculated and outputted at every timestep. Therefore, the amount of data of the sequentially outputted calculation results becomes huge.

Specifically, the amount of data outputted as above can be represented by the product of the mesh size in the physical space in which the calculation is performed, the number of timesteps, and the number of handled physical quantities. For example, in the model in which the mesh size in a three-dimensional space is 10,000×10,000×10,000, and the number of timesteps indicating the elapse of time is 100,000, and the number of physical quantities each represented by eight bytes is 100, the total amount of the output data is approximately 804 petabytes ($804 \times 10^{15}$ bytes). Therefore, the storage capacity of a hard disk or the like for storing the huge amount of data as above is necessary.

In addition, the output data as above are also used for displaying a simulation process by coupling the output data to a visualization device such as a display device. However, the processing time for displaying the huge amount of data also becomes huge.

As explained above, programs (such as simulation programs) which output a great amount of calculation results and perform analysis on the basis of the calculation results require a long processing time and great areas for storing calculation results.

Conventionally, in some cases, techniques of thinning out data are used for solving the above problems. For example, data are thinned out according to the variation rates of data sampled at predetermined time intervals (See, for example, Japanese Laid-open Patent Publication No. 2000-206105).

However, it is difficult to appropriately set the intervals at which the data obtained by performing simulation are thinned out. That is, in some cases where the thinning-out intervals are great, data in a time interval of interest or a spatial region of interest can be lost, i.e., necessary data can be lost. On the other hand, in the case where the thinning-out intervals are small, the amount of data cannot be greatly reduced.

In addition, in the case where the technique disclosed in Japanese Laid-open Patent Publication No. 2000-206105 is applied to a simulation of a phenomenon in a physical space with a large-scale model as mentioned before, and the spatial variation rates (the X-, Y-, and Z-axes in a three-dimensional space) and timewise variation rates (along the time axis) are obtained on a point-by-point basis in the physical space, the burden of calculation greatly increases since the handled data are multidimensional.

SUMMARY

According to an aspect of the invention, a computer-readable recording medium storing a data recording program for recording data which varies with time in a space constituted by dimensional axes, when executed by a computer, causes the computer to function as: a data acquisition unit which acquires data varying with displacement in the direction of each of the dimensional axes and time indicated by a time axis, in correspondence with the time axis and each of the dimensional axes; a mode setting unit which sets the computer in a dimensionality investigation mode for determining, on the basis of magnitudes of variations of the data in axial directions, one or more objective axes to be one or more objects of investigation as to dimensionality, and clears setting of the dimensionality investigation mode; an axis-determinative variation-rate calculation unit which calculates, on the basis of the data acquired by the data acquisition unit, an axial data variation rate indicating a rate of variation in the acquired data corresponding to displacement in a direction of each of the dimensional axes and the time axis, while the computer is in the dimensionality investigation mode; an axis determination unit which determines, on the basis of the axial data variation rate calculated by the axis-determinative variation-rate calculation unit, whether or not the axial data variation rate corresponding to each of the dimensional axes and the time axis is low; an objective-axis setting unit which sets one or more of the dimensional axes and the time axis as one or more objective axes when one or more axial data variation rates corresponding to the one or more of the dimensional axes and the time axis are determined by the axis determination unit to be high, and does not set the other of the dimensional axes and the time axis as one or more objective axes when one or more axial data variation rates corresponding to the other of the dimensional axes and the time axis are determined by the axis determination unit not to be high; a recording-determinative variation-rate calculation unit which calculates, on the basis of the data acquired by the data acquisition unit, an axial data variation rate indicating a rate of variation in the acquired data corresponding to displacement in a direction of each of the one or more objective axes which are set by the objective-axis setting unit, while the computer is out of the dimensionality investigation mode; a recording determination unit which determines, on the basis of the axial data variation rate calculated by the recording-determinative variation-rate calculation unit, whether to record the data; and a recording unit which records in a data table the data when the recording determination unit determines to record the data, and does not record in the data table the data corresponding to the data when the recording determination unit determines not to record the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data structure of a setting parameter table;

FIG. 7 is a diagram illustrating an example of a data structure of a spatial data table in the case of the unidimensionality model;

FIG. 9 is a diagram illustrating an example of a data structure of a spatial data table in the case of the bidimensionality model;

FIG. 11 is a diagram illustrating an example of a data structure of a spatial data table in the case of the tridimensionality model;

DESCRIPTION OF EMBODIMENT(S)

Figure 1:
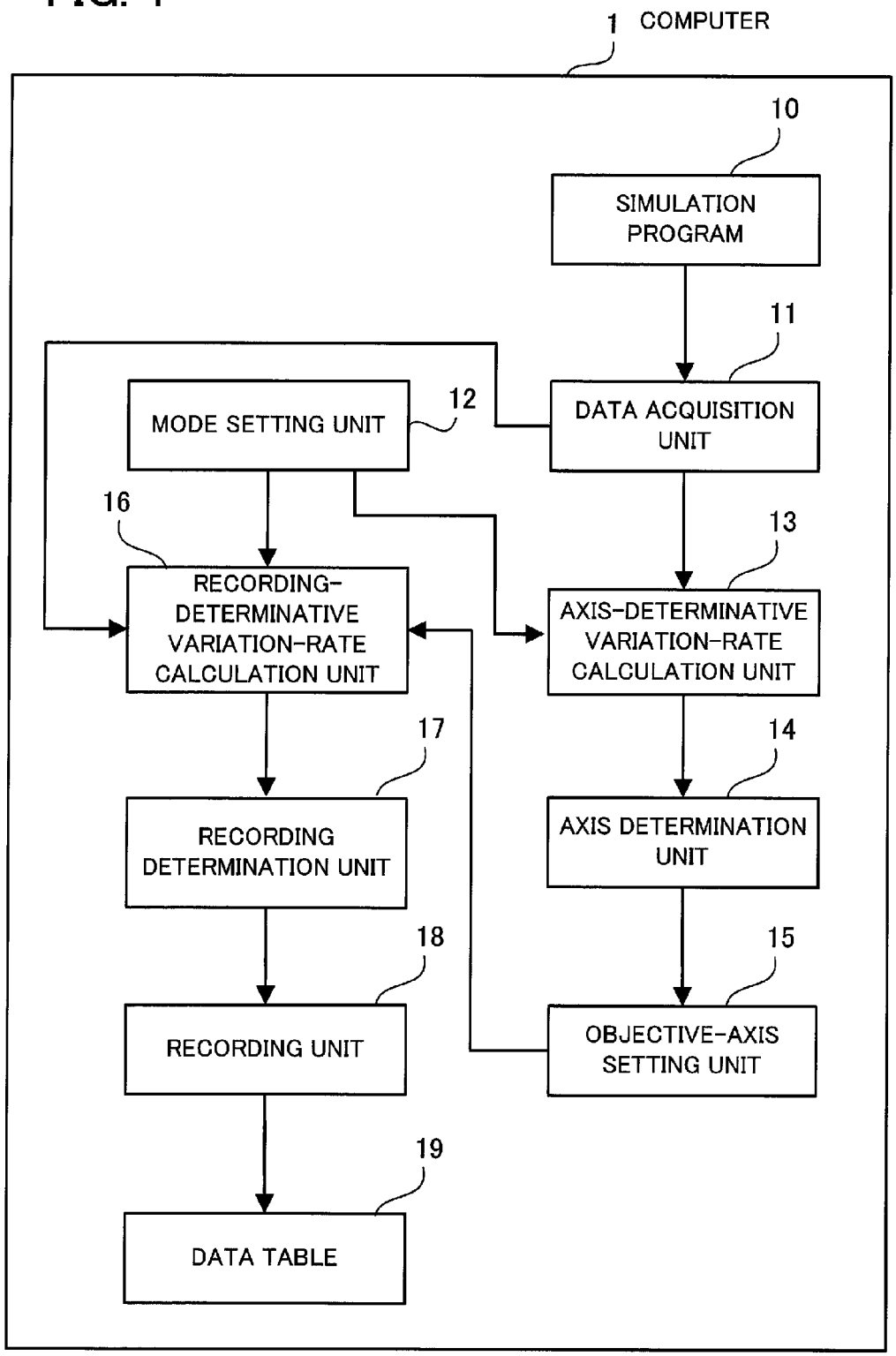
FIG. 1 is a diagram illustrating an outline of an embodiment.

An embodiment of the present invention will be explained below with reference to the accompanying drawings, wherein like reference numerals refer to like elements throughout. First, an outline of the embodiment is explained, and then details of the embodiment are explained.

FIG. 1 is a diagram illustrating the outline of the embodiment. The computer 1 illustrated in FIG. 1 can save the storage capacity necessary for storing data, and reduce the burden of calculation performed for decreasing the number of data items, where the data is obtained by calculation by a simulation program 10 or the like, and varies in a multidimensional space constituted by a plurality of dimensional axes. The computer 1 comprises a data acquisition unit 11, a mode setting unit 12, an axis-determinative variation-rate calculation unit 13, an axis determination unit 14, an objective-axis setting unit 15, a recording-determinative variation-rate calculation unit 16, a recording determination unit 17, and a recording unit 18.

The data acquisition unit 11 acquires data in correspondence with each dimensional axis and the time axis, where the data is calculated by the simulation program 10 or the like, varies with displacement in the direction of each dimensional axis (constituting the space) and time (indicated by the time axis), and corresponds to data of each dimensional axis.

The mode setting unit 12 sets the computer 1 in a dimensionality investigation mode, in which one or more objective axes (as one or more objects to be investigated as to dimensionality) are determined on the basis of the magnitudes of variations of the data in the axial directions. In addition, the mode setting unit 12 clears the setting of the dimensionality investigation mode.

In the dimensionality investigation mode, the axis-determinative variation-rate calculation unit 13 calculates, on the basis of the data acquired by the data acquisition unit 11, an axial data variation rate indicating the rate of variation in the acquired data corresponding to displacement in the direction of each of the dimensional axes and the time axis.

The axis determination unit 14 determines, on the basis of the axial data variation rates calculated by the axis-determinative variation-rate calculation unit, whether or not the axial data variation rate corresponding to each axis is low.

The objective-axis setting unit 15 sets each axis as an objective axis when the axial data variation rate corresponding to the axis is determined by the axis determination unit 14 to be high, and does not set each axis as an objective axis when the axial data variation rate corresponding to the axis is not determined by the axis determination unit 14 to be high.

While the computer 1 is out of the dimensionality investigation mode, the recording-determinative variation-rate calculation unit 16 calculates, on the basis of the data acquired by the data acquisition unit 11, an axial data variation rate indicating the rate of variation in the acquired data corresponding to displacement in the direction of each objective axis which is set by the objective-axis setting unit 15.

The recording determination unit 17 determines, on the basis of the axial data variation rate calculated by the recording-determinative variation-rate calculation unit 16, whether to record the acquired data.

The recording unit 18 records in the data table 19 the acquired data when the recording determination unit 17 determines to record the acquired data, and does not record in the data table 19 the acquired data when the recording determination unit 17 determines not to record the acquired data.

In the computer executing the above data recording program, the data which varies with time and displacement in the direction of each dimensional axis is acquired by the data acquisition unit 11 in correspondence with each dimensional axis and the time axis. The computer is set by the mode setting unit 12 to the dimensionality investigation mode, in which one or more objective axes (as one or more objects to be investigated as to dimensionality) are determined on the basis of the magnitudes of variations of the data in axial directions. In addition, the setting of the dimensionality investigation mode is cleared from the computer by the mode setting unit 12. In the dimensionality investigation mode, an axial data variation rate indicating the rate of variation in the acquired data corresponding to displacement in the direction of each axis is calculated by the axis-determinative variation-rate calculation unit 13 on the basis of the acquired data. It is determined by the axis determination unit 14 whether or not the axial data variation rate corresponding to each axis is low, on the basis of the axial data variation rate. Each axis is set to be an objective axis by the objective-axis setting unit 15 when the axial data variation rate corresponding to the axis is determined to be high, and is not set to be an objective axis by the objective-axis setting unit 15 when the axial data variation rate corresponding to the axis is not determined to be high. While the computer 1 is out of the dimensionality investigation mode, an axial data variation rate indicating the rate of variation in the acquired data corresponding to displacement in the direction of each objective axis is calculated by the recording-determinative variation-rate calculation unit 16 on the basis of the acquired data. It is determined by the recording determination unit 17 whether to record data, on the basis of the axial data variation rate calculated by the recording-determinative variation-rate calculation unit 16. When it is determined to record the data, the data corresponding to the data is recorded by the recording unit 18. When it is determined not to record the data, the data is not recorded.

Hereinbelow, details of the embodiment are explained with reference to drawings.

Figure 2:
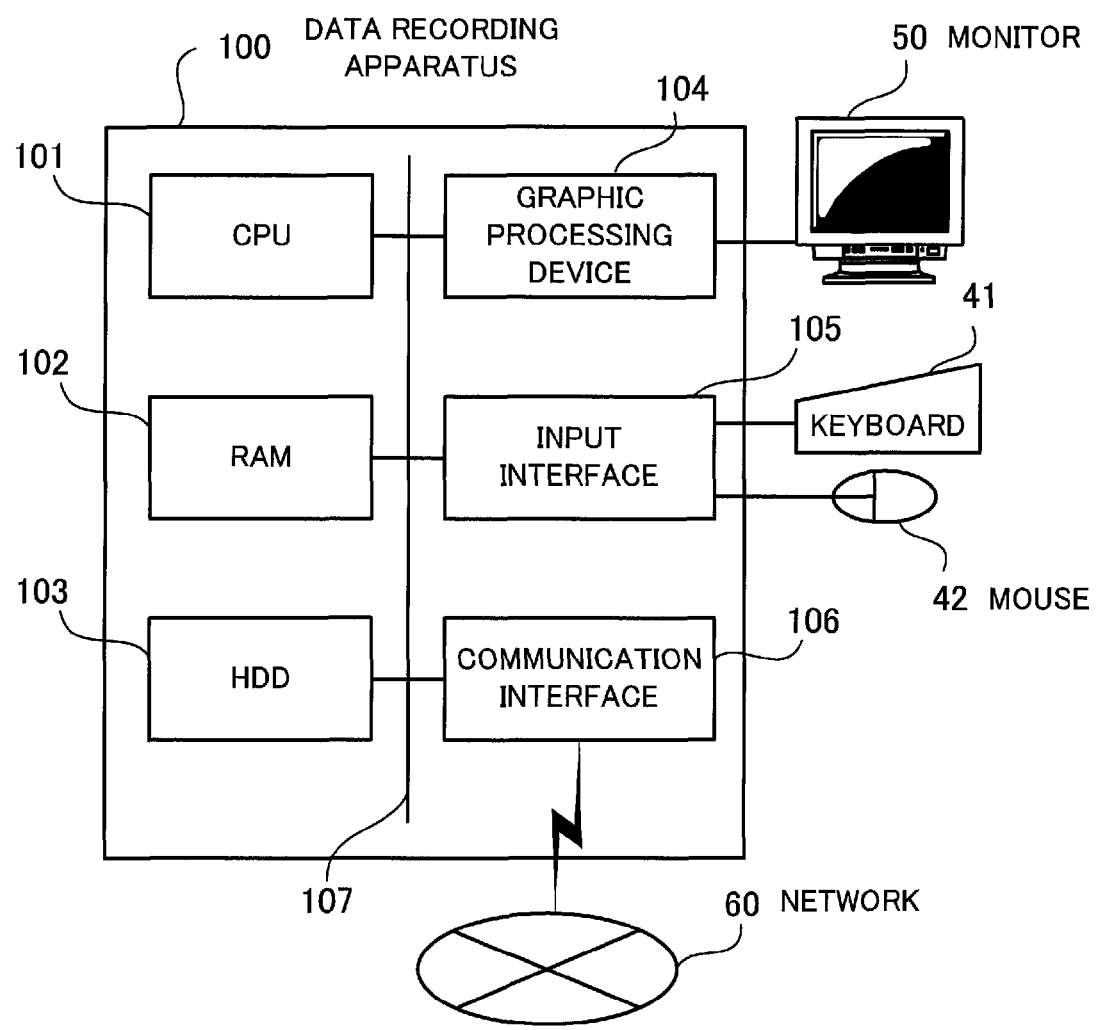
FIG. 2 is a diagram illustrating a hardware construction of a data recording apparatus.

FIG. 2 is a diagram illustrating a hardware construction of a data recording apparatus. The entire data recording apparatus 100 is controlled by a CPU (central processing unit) 101, to which a RAM (random access memory) 102, an HDD (hard disk drive) 103, a graphic processing device 104, an input interface 105, and a communication interface 106 are connected through a bus 107.

The RAM 102 temporarily stores at least portions of an OS (operating system) program and application programs which are executed by the CPU 101, as well as various types of data necessary for processing by the CPU 101. The HDD 103 stores the OS program and the application programs.

A monitor 50 is connected to the graphic processing device 104, which makes the monitor 50 display an image on a screen in accordance with an instruction from the CPU 101. A keyboard 41 and a mouse 42 are connected to the input interface 105, which transmits signals sent from the keyboard 41 and the mouse 42, to the CPU 101 through the bus 107. The communication interface 106 is connected to a network 60, so that the data recording apparatus 100 can exchange data with other computers through the network 60.

By using the above hardware construction, it is possible to realize the processing functions of the present embodiment.

Next, the module configuration of the data recording apparatus 100 is explained below.

Figure 3:
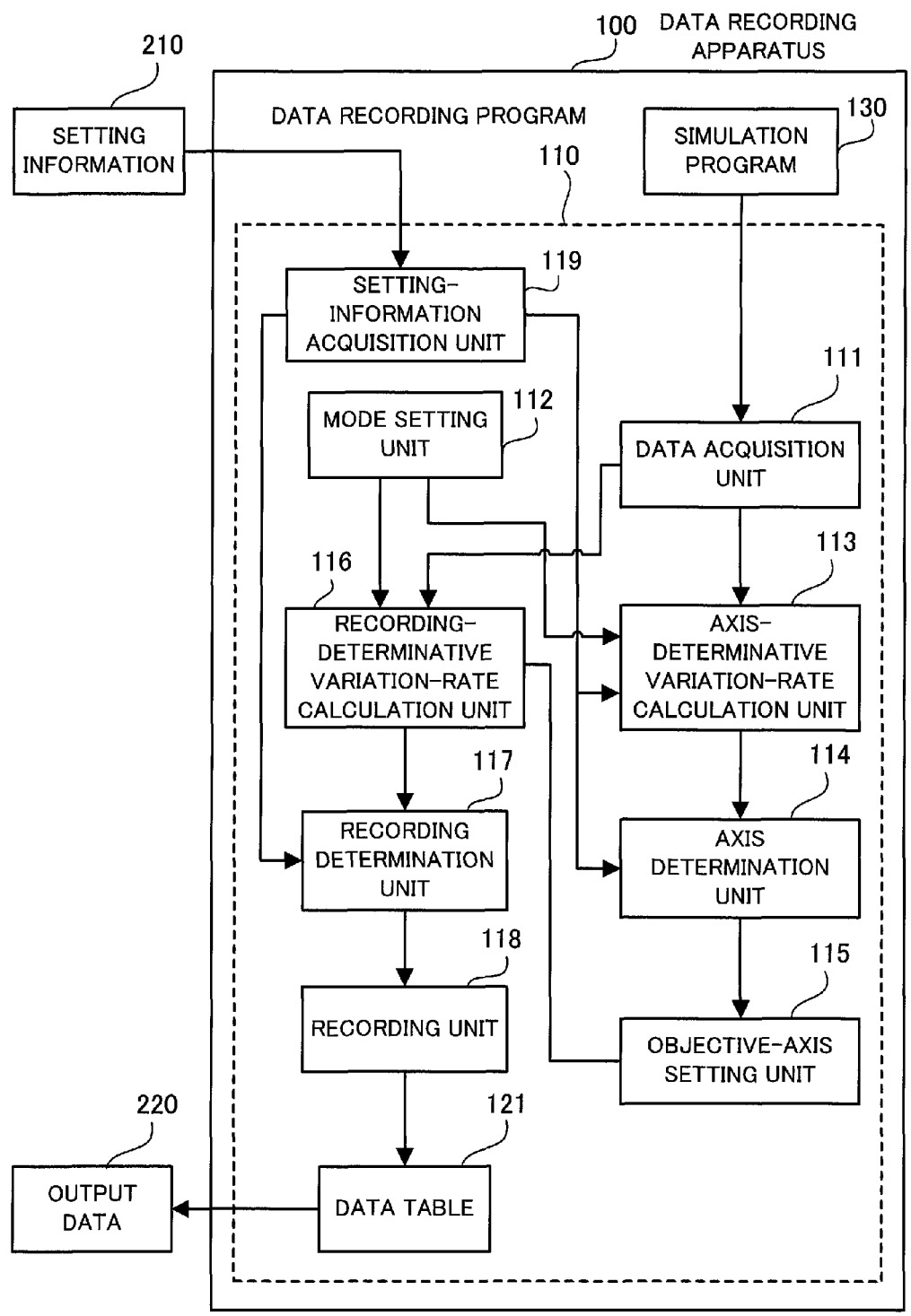
FIG. 3 is a block diagram illustrating the functions of the data recording apparatus.

FIG. 3 is a block diagram illustrating the functions of the data recording apparatus. The data recording apparatus 100 comprises a data acquisition unit 111, a mode setting unit 112, an axis-determinative variation-rate calculation unit 113, an axis determination unit 114, an objective-axis setting unit 115, a recording-determinative variation-rate calculation unit 116, a recording determination unit 117, a recording unit 118, and a setting-information acquisition unit 119.

The data acquisition unit 111 acquires data which is calculated by a simulation program 130 or the like, varies with displacement in the direction of each dimensional axis (constituting the space) and time (indicated by the time axis), and corresponds to data of each dimensional axis, in correspondence with each dimensional axis and the time axis. The data acquired as above is successively calculated with stepwise progression of a simulation corresponding to displacement along the time axis, so that the data acquisition unit 111 acquires the data on the basis of the displacement along the time axis. However, calculation and acquisition of the data may be performed in other manners. For example, the stepwise progression of the simulation and the data acquisition by the data acquisition unit 111 may be performed on the basis of one of the spatial axes or other parameters.

The mode setting unit 112 sets the computer 1 in a dimensionality investigation mode, in which one or more objective axes (as one or more objects to be investigated as to dimensionality) are determined on the basis of the magnitudes of variations of the data in axial directions. In addition, the mode setting unit 112 clears the setting of the dimensionality investigation mode. Specifically, the mode setting unit 112 sets the computer to the dimensionality investigation mode so that a predetermined number of data sets beginning from the data set which is first acquired by the data acquisition unit 111 are processed in the dimensionality investigation mode, and then the mode setting unit 112 clears the setting of the dimensionality investigation mode so that data sets following the predetermined number of data sets are processed out of the dimensionality investigation mode.

In addition, the mode setting unit 112 sets the computer to the dimensionality investigation mode so that a predetermined number of data sets beginning from a certain data set are processed in the dimensionality investigation mode, and then the mode setting unit 112 clears the setting of the dimensionality investigation mode so that a second predetermined number of data sets following the predetermined number of data sets are processed out of the dimensionality investigation mode. Thereafter, the mode setting unit 112 repeats setting and clearing of the dimensionality investigation mode for processing data alternately in and out of the dimensionality investigation mode as above. Thus, an opportunity to reinvestigate the dimensionality is periodically provided, so that lightening of the burden of calculation and reduction of the number of data items can be appropriately realized even in the case where the data is based on a model allowing variations in the dimensionality.

In the dimensionality investigation mode, the axis-determinative variation-rate calculation unit 113 calculates, on the basis of the data acquired by the data acquisition unit 111, an axial data variation rate indicating the rate of variation in the acquired data corresponding to displacement in the direction of each of the dimensional axes and the time axis. Specifically, the axis-determinative variation-rate calculation unit 113 calculates as an axial data variation rate corresponding to each dimensional axis an average value per unit time of the variation rates of the data in the direction of the axis.

The axis determination unit 114 determines, on the basis of the axial data variation rates calculated by the axis-determinative variation-rate calculation unit, whether or not the axial data variation rate corresponding to each axis is low. Specifically, the axis determination unit 114 compares the axial data variation rate corresponding to each dimensional axis and being calculated by the axis-determinative variation-rate calculation unit 113 with a threshold corresponding to the dimensional axis and being acquired by the setting-information acquisition unit 119, and determines that the axial data variation rate corresponding to the dimensional axis is low when the axial data variation rate corresponding to the dimensional axis is lower than the threshold.

The objective-axis setting unit 115 sets each axis as an objective axis when the axial data variation rate corresponding to the axis is determined by the axis determination unit 114 to be high, and does not set each axis as an objective axis when the axial data variation rate corresponding to the axis is not determined by the axis determination unit 114 to be high.

While the data recording apparatus 100 is out of the dimensionality investigation mode, the recording-determinative variation-rate calculation unit 116 calculates, on the basis of the data acquired by the data acquisition unit 111, an axial data variation rate indicating the rate of variation of the data in axial directions corresponding to displacement in the direction of each objective axis which is set by the objective-axis setting unit 115. Specifically, while the data recording apparatus 100 is out of the dimensionality investigation mode, the recording-determinative variation-rate calculation unit 116 calculates as the axial data variation rate corresponding to each objective axis an average value per unit time of variation rates of the data in the direction of the objective axis, on the basis of the data acquired by the data acquisition unit 111, and the axial data variation rate or rates corresponding to only the objective axis or axes is calculated.

The recording determination unit 117 determines, on the basis of the axial data variation rates calculated by the recording-determinative variation-rate calculation unit 116, whether to record the acquired data. Specifically, the recording determination unit 117 compares the axial data variation rate corresponding to each objective axis calculated by the recording-determinative variation-rate calculation unit 116 with a threshold corresponding to the objective axis which is acquired by the setting-information acquisition unit 119, and determines not to record in a data table 121 the acquired data when the axial data variation rate or rates corresponding to all of the objective axis or axes are lower than the corresponding threshold or thresholds.

The recording unit 118 records in the data table 121 the acquired data when the recording determination unit 117 determines to record the acquired data, and does not record in the data table 121 the acquired data when the recording determination unit 117 determines not to record the acquired data. The data recording apparatus 100 according to the present embodiment can output as output data 220 the contents of the data table 121, in which the data acquired by the recording unit 118 is recorded.

The setting-information acquisition unit 119 acquires from setting information 210 thresholds corresponding to the axes and one or more designated axes, where the thresholds are used in the determination as to whether or not the axial data variation rates are low, and the one or more designated axes are designated by a user as one or more objects of determinations which are made by the axis determination unit 114. The setting information 210 is inputted by the user for setting a data recording program 110.

As a first alternative to the present embodiment, the mode setting unit 112 may set and clear the dimensionality investigation mode so that data which are acquired by the data acquisition unit 111 during a predetermined time after the beginning of the acquisition are processed in the dimensionality investigation mode, and then data which are acquired by the data acquisition unit 111 after the predetermined time from the beginning of the acquisition are processed out of the dimensionality investigation mode. As a second alternative to the present embodiment, the mode setting unit 112 may set and clear the dimensionality investigation mode so that data sets which are acquired by the data acquisition unit 111 during a first predetermined time after acquisition of a certain data set are processed in the dimensionality investigation mode, and then data sets which are acquired by the data acquisition unit 111 during a second predetermined time after the elapse of the first predetermined time are processed out of the dimensionality investigation mode. Thereafter, the mode setting unit 112 repeats setting and clearing of the dimensionality investigation mode so that data are processed alternately in and out of the dimensionality investigation mode as above. Thus, the dimensionality investigation mode can be set and cleared at regular intervals even when data are not acquired at regular intervals along the time axis.

As a third alternative to the present embodiment, the axis-determinative variation-rate calculation unit 113 may calculate an average value per unit time of variation rates of the data in the direction of each of only the one or more designated axes, as the axial data variation rate in the direction of the designated axis. Then, the axis determination unit 114 compares the axial data variation rate corresponding to each of only the one or more designated axes and being calculated by the axis-determinative variation-rate calculation unit 113 with a threshold corresponding to the designated axis and being acquired by the setting-information acquisition unit 119, and determines that the axial data variation rate corresponding to the designated axis is low when the axial data variation rate corresponding to the designated axis is lower than the threshold. In this case, the calculation of the variation rates is limited to the axis or axes designated as one or more objects of the axis determination by the user, so that the amount of calculation can be reduced.

As a fourth alternative to the present embodiment, the recording determination unit 117 may compare the axial data variation rate corresponding to each of only the one or more designated axes and being calculated by the recording-determinative variation-rate calculation unit 116 with a threshold corresponding to the objective axis and being acquired by the setting-information acquisition unit 119, and determine not to record in the data table 121 the acquired data when the axial data variation rate corresponding to the objective axis is lower than the corresponding threshold. Since the data is not recorded when the axial data variation rate corresponding to the objective axis is lower than the corresponding threshold, it is possible to greatly reduce the number of data items.

Next, the setting parameter table in the data recording apparatus 100 is explained below.

FIG. 4 is a diagram illustrating an example of a data structure of the setting parameter table.

The setting information 210 indicating setting parameters for reducing the number of data items by the data recording apparatus 100 is tabulated and stored in the setting parameter table 701. The setting parameter table 701 has a field 701a for indicating the name of each parameter, and a field 701b for indicating the value of each parameter which is currently set. The information items tabulated in each row of the setting parameter table 701 are associated with each other, and constitute a set of update information.

The name of each parameter is set in the field 701a.
The value of each parameter is set in the field 701b.
The setting parameter table 701 is stored in the RAM 102 in the data recording apparatus 100.

Each parameter included in the setting information 210 stored in the setting parameter table 701 is explained below.

The setting information 210 is inputted by the user using an input interface such as the keyboard 41, and the parameters included in the setting information 210 are stored in the setting parameter table 701.

The parameters in the setting information 210 include the number of steps N, the number of steps Ns, the thresholds for the respective axes, the time axis, the X-axis, the Y-axis, and the Z-axis (in the case of the three-dimensional space), the condition for determination, and the designated axis.

The number of steps N is the number of steps repeated in the data recording process for investigating the dimensionality, where the data recording process is explained later (with reference to FIGS. 12 and 13). The number of steps Ns is the number of steps repeated for calculating the axial data variation rate or rates corresponding to only the one or more objective axes. Each of the X-axis, the Y-axis, the Z-axis is a dimensional axis. The thresholds for the respective dimensional axes and the time axis are values which are to be compared with the axial data variation rates for the determination of the one or more objective axes and the determination of the data recording.

In the case where there are many objective axes in directions in which the variation rates are to be calculated, and the condition "AND" is designated as the condition for determination, the data is not recorded unless the variation rates corresponding to all the objective axes are equal to or higher than the corresponding thresholds. In the case where there are many objective axes in directions in which the variation rates are to be calculated, and the condition "OR" is designated as the condition for determination, the data is recorded when the variation rate corresponding to one of the objective axes is equal to or higher than the corresponding threshold.

The data is recorded when the variation rate or rates corresponding to only the one or more designated axes are equal to or higher than the corresponding threshold or thresholds. Further, in the case where there are a plurality of designated axes, and the condition "AND" is designated as the condition for determination, the data is not recorded unless the variation rates in the directions of all the designated axes are equal to or higher than the corresponding thresholds. In the case where there are a plurality of designated axes, and the condition "OR" is designated as the condition for determination, the data is recorded when the variation rate in the direction of one of the designated axes is equal to or higher than the corresponding threshold. Next, the determination as to whether to record data, which is made in the data recording apparatus 100, is explained below.

Figure 5:
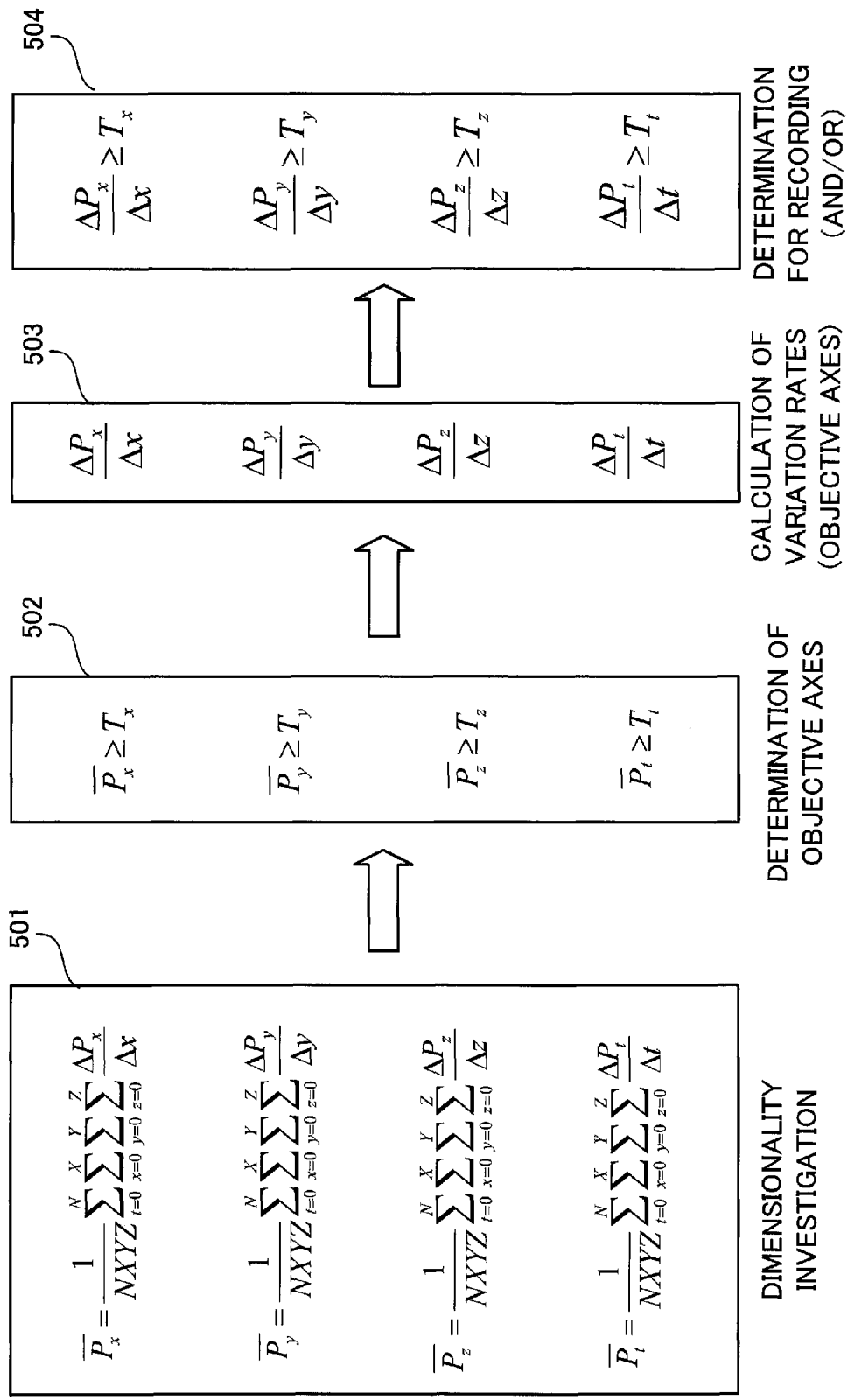
FIG. 5 is a diagram illustrating calculations performed in the data recording apparatus.

FIG. 5 is a diagram illustrating calculations performed in the data recording apparatus. The data recording apparatus 100 according to the present embodiment acquires data indicating calculated physical quantities every time a simulation step is executed during execution of the simulation program 130.

The data recording apparatus 100 performs, on the basis of the acquired data, an investigation (dimensionality investigation 501) as to the dimensionality of the physical space subject to the simulation during the N steps for investigating the dimensionality (indicated in the setting parameter table 701). Thereafter, the data recording apparatus 100 makes a determination (objective-axis determination 502) for determining one or more objective axes to be one or more objects for which the variation rates are to be obtained.

Next, the data recording apparatus 100 makes a variation-rate calculation 503 and a recording determination 504 during the Ns steps for calculation of variation rates (indicated in the setting parameter table 701), where variation rates corresponding to only the one or more objective axes are calculated in the variation-rate calculation 503, and a determination as to recording is made in the recording determination 504 on the basis of the calculated variation rates. Therefore, only the data satisfying the condition are recorded in the data table 121. The operations of the dimensionality investigation 501, the objective-axis determination 502, the variation-rate calculation 503, and the recording determination 504 are repeatedly performed until the simulation is completed.

The calculations performed by the data recording apparatus 100 according to the present embodiment are explained below by using an example in which the dimensionality of a physical quantity P is investigated. In the case where the simulation is performed in a three-dimensional physical space, the variation rates in the directions of spatial axes include three types of variation rates, i.e., the variation rates in the X-, Y-, and Z-directions in the three-dimensional space. In addition, the variation rates further include the variation rate along the time axis. Therefore, there are four types of variation rates in total. The average value of the variation rates in the three-dimensional physical space is calculated by using data which are acquired by execution of simulation steps in the direction of each axis.

First, in the dimensionality investigation 501, the variation rate (axial data variation rate) for each of the dimensional axes and the time axis is calculated. For example, the variation rate of the physical quantity P in the X-axis direction is calculated in a timestep as $\Delta Px/\Delta x=(P(x+\Delta x, y, z)-P(x, y, z))/\Delta x$, where $P(x, y, z)$ is the physical quantity P at the coordinates $(x, y, z)$, and $P(x+\Delta x, y, z)$ is the physical quantity P at adjacent coordinates $(x+\Delta x, y, z)$. Then, an average value of the variation rates in the X-axis direction in the entire coordinate space is calculated on the basis of the variation rates of the physical quantity P in the X-axis direction obtained as above. Thereafter, every time the data as a result of execution of each step of the simulation program 130 is acquired, a variation rate in the entire coordinate space is calculated. The average value of the variation rates during N steps in the dimensionality investigation 501 is calculated by the following formula (1), where N is indicated in the setting information 210 (as illustrated in FIG. 4).

$$\overline{P_x} = \frac{1}{NXYZ}\sum_{t=0}^{N}\sum_{x=0}^{X}\sum_{y=0}^{Y}\sum_{z=0}^{Z}\frac{\Delta P_x}{\Delta x} \quad (1)$$

Similarly, the average value of the variation rates in the direction of each of the Y-axis, Z-axis, and the time axis can be calculated in the dimensionality investigation 501 by the following formulas (2), (3), and (4), respectively.

$$\overline{P_y} = \frac{1}{NXYZ}\sum_{t=0}^{N}\sum_{x=0}^{X}\sum_{y=0}^{Y}\sum_{z=0}^{Z}\frac{\Delta P_y}{\Delta y} \quad (2)$$

$$\overline{P_z} = \frac{1}{NXYZ}\sum_{t=0}^{N}\sum_{x=0}^{X}\sum_{y=0}^{Y}\sum_{z=0}^{Z}\frac{\Delta P_z}{\Delta z} \quad (3)$$

$$\overline{P_t} = \frac{1}{NXYZ}\sum_{t=0}^{N}\sum_{x=0}^{X}\sum_{y=0}^{Y}\sum_{z=0}^{Z}\frac{\Delta P_t}{\Delta t} \quad (4)$$

Next, in the objective-axis determination 502, one or more objective axes in one or more directions in which the variation-rate calculation 503 (as explained later) is to be performed are determined for determining whether to record data (which is explained later). The objective-axis determination 502 is performed for each of the axes by using the threshold corresponding to the axis, which is set by the user using the setting information 210. Then, only one or more of the axes corresponding to one or more of the thresholds ($T_x$, $T_y$, $T_z$, and $T_t$) stored in the setting parameter table 701 which are exceeded are selected as one or more calculation axes. Only one or more of the axes in one or more directions in which the variation rate or rates are equal to or higher than the corresponding threshold or thresholds are determined to be one or more axes corresponding to one or more high variation rates, and to be the one or more objective axes for use in the variation-rate calculation 503. Specifically, the objective-axis determination 502 is made by using the following formulas (5) to (8) for the spatial axes (X-, Y-, and Z-axes) and the time axis, respectively.

$$\overline{P_x} \geq T_x \quad (5)$$

$$\overline{P_y} \geq T_y \quad (6)$$

$$\overline{P_z} \geq T_z \quad (7)$$

$$\overline{P_t} \geq T_t \quad (8)$$

Next, in the variation-rate calculation 503, every time the data as a result of execution of each step of the simulation program 130 is acquired, variation rates are calculated from the data for the one or more objective axes determined in the objective-axis determination 502. For example, in the case where only the Y-axis and the Z-axis are set as the objective axes, the variation rates $\Delta Py/\Delta y=(P(x, y+\Delta y, z)-P(x, y, z))/\Delta y$ and $\Delta Pz/\Delta z=(P(x, y, z+\Delta z)-P(x, y, z))/\Delta z$ for only the above two axes are calculated, and the variation rates in the directions of the X-axis and the time axis are not calculated. The variation-rate calculation 503 is performed in accordance with the following formulas (9) to (12).

$$\frac{\Delta P_x}{\Delta x} \quad (9)$$

$$\frac{\Delta P_y}{\Delta y} \quad (10)$$

$$\frac{\Delta P_z}{\Delta z} \quad (11)$$

$$\frac{\Delta P_t}{\Delta t} \quad (12)$$

Next, in the recording determination 504, it is determined whether to record in the data table 121 the data as a result of each step of the simulation program 130, on the basis of the variation rate corresponding to each axis and being calculated by the variation-rate calculation 503. The recording determination 504 is made by using the following formulas (13) to (16).

$$\frac{\Delta P_x}{\Delta x} \geq T_x \quad (13)$$

$$\frac{\Delta P_y}{\Delta y} \geq T_y \quad (14)$$

$$\frac{\Delta P_z}{\Delta z} \geq T_z \quad (15)$$

$$\frac{\Delta P_t}{\Delta t} \geq T_t \quad (16)$$

In the case where a great number of objective axes exist in the recording determination 504, it is determined whether to record data, by using the one or more designated axes designated by the user and the condition for determination ("AND" or "OR"), which are included in the setting information 210 stored in the setting parameter table 701 (illustrated in FIG. 4).

In the case where a great number of objective axes exist, and the condition "AND" is designated, the data is not recorded unless the variation rates in the directions of all the objective axes are equal to or higher than the corresponding thresholds. In the case where a great number of objective axes exist, and the condition "OR" is designated as the condition for determination, the data is recorded when the variation rate in the direction of one of the objective axes is equal to or higher than the corresponding threshold.

In the case where one or more axes are designated by the user, the data is recorded when the one or more variation rates corresponding to only the one or more designated axes are equal to or higher than the one or more corresponding thresholds, respectively. Further, in the case where there are a plurality of designated axes, and the condition "AND" is designated as the condition for determination, the data is not recorded unless the variation rates in the directions of all of the designated axes are equal to or higher than the corresponding thresholds. In the case where there are a plurality of designated axes, and the condition "OR" is designated as the condition for determination, the data is recorded when the variation rate corresponding to one of the designated axes is equal to or higher than the corresponding threshold.

Hereinbelow, the dimensionality is explained. First, unidimensionality and a unidimensionality model are explained.

Figure 6:
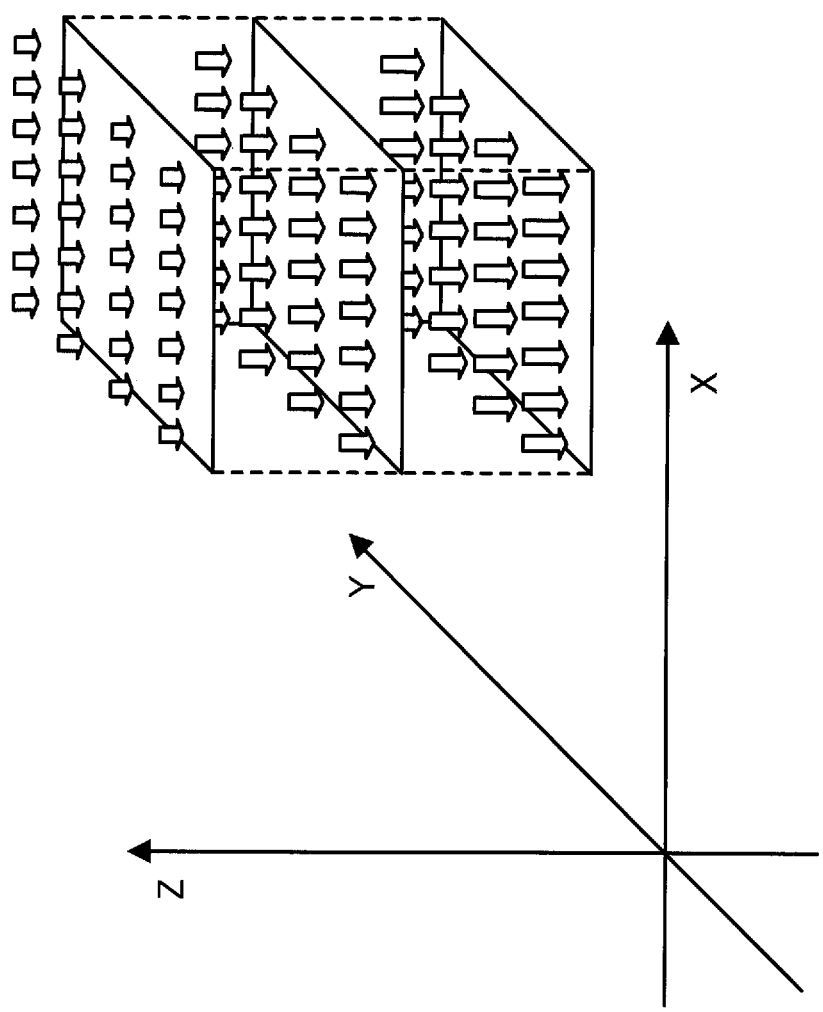
FIG. 6 is a diagram illustrating an example of a unidimensionality model.

FIG. 6 is a diagram illustrating an example of a unidimensionality model. The unidimensionality model according to the present embodiment is a model in which great variations occur in a unidimensional direction in a space, for example, as in the case of sedimentation of material (where variations occur in a vertical direction). In the unidimensionality model, importance is given to the variation rates in the unidimensional direction and the direction of the time axis.

In FIG. 6, the magnitudes of a physical quantity are indicated by the lengths of the hollow arrows. In the example of FIG. 6, the lengths of the hollow arrows greatly vary in correspondence with displacement in the Z-axis direction. The lengths of the hollow arrows decrease with increase in the values of the Z coordinate. On the other hand, the lengths of the hollow arrows hardly vary with displacement in the X- or Y-axis direction. As explained above, in the unidimensionality model, the variations of the physical quantity with displacement in a unidimensional direction in the space (e.g., in the Z-axis direction in the example of FIG. 6) are great, while the variations of the physical quantity with displacement in the directions of the other dimensional axes (e.g., in the direction of the X-axis or the Y-axis in the example of FIG. 6) are small.

Next, a spatial data table for a unidimensionality model, which the data recording apparatus 100 has, is explained below.

FIG. 7 is a diagram illustrating an example of a data structure of a spatial data table in the case of a unidimensionality model. In the spatial data table 910, an example of a data set which is acquired as a result of execution of a simulation in the case of a unidimensionality model is tabulated by the recording unit 118, and stored as the data table 121. The spatial data table 910 has a field 911 of "TIME," a field 912 of "X-AXIS," a field 913 of "Y-AXIS," a field 914 of "Z-AXIS," and a field 915 of "OUTPUT." The information items tabulated in each row of the spatial data table 910 are associated with each other, and constitute a set of multidimensional data.

A value of the time axis is set in the field 911. A value of the X-axis is set in the field 912. The value in the field 912 is used for calculating an axial data variation rate in the direction of the X-axis. A value of the Y-axis is set in the field 913. The value in the field 913 is used for calculating an axial data variation rate in the direction of the Y-axis. A value of the Z-axis is set in the field 914. The value in the field 914 is used for calculating an axial data variation rate in the direction of the Z-axis. According to the present embodiment, data indicating a physical quantity calculated by the simulation program 130 is set in the field 915.

Next, the variation rate in the direction of an axis (i.e., the axial data variation rate) in a unidimensionality model is explained on the basis of an example of data stored in the spatial data table 910.

In the case where the variation rate in the direction of the X-axis is calculated, a difference of the data value corresponding to a greater X-coordinate from the data value corresponding to a smaller X-coordinate is calculated for every pair of data values corresponding to X-coordinates differing by one from each other and identical Y-, Z-, and time coordinates. Then, an average value of the calculated differences is obtained as the variation rate in the direction of the X-axis.

The above operations for obtaining the variation rate in the direction of the X-axis are explained more concretely by using the data values in the spatial data table 910. In the spatial data table 910, the pairs of data values corresponding to two X-coordinates differing by one from each other and identical Y-, Z-, and time coordinates include the pair of the data values 915a and 915g, the pair of the data values 915b and 915h, and the pair of the data values 915c and 915j. The difference of the data value corresponding to a greater X-coordinate from the data value corresponding to a smaller X-coordinate is calculated for each of the above pairs, so that the differences of 0.1 (=1.8−1.7), 0.1 (=2.3−2.2), and 0.1 (=2.7−2.6) are obtained for the respective pairs. Then, the average value of the above differences, 0.1 (=(0.1+0.1+0.1)/3), is obtained as the variation rate in the direction of the X-axis.

Similarly, the variation rate in the direction of the Y-axis is calculated as follows. In the spatial data table 910, the pairs of data values corresponding to two Y-coordinates differing by one from each other and identical X-, Z-, and time coordinates include the pair of the data values 915a and 915d, the pair of the data values 915b and 915e, and the pair of the data values 915c and 915f. The difference of the data value corresponding to a greater Y-coordinate from the data value corresponding to a smaller Y-coordinate is calculated for each of the above pairs, so that the differences of 0 (=1.7−1.7), 0 (=2.2−2.2), and −0.1 (=2.5−2.6) are obtained for the respective pairs. Then, the average value of the above differences, −0.03 (≈(0+ 0−0.1)/3), is obtained as the variation rate in the direction of the Y-axis.

Similarly, the variation rate in the direction of the Z-axis is calculated as follows. In the spatial data table 910, the pairs of data values corresponding to two Z-coordinates differing by one from each other and identical X-, Y-, and time coordinates include the pair of the data values 915a and 915b, the pair of the data values 915b and 915c, the pair of the data values 915d and 915e, the pair of the data values 915e and 915f, the pair of the data values 915g and 915h, and the pair of the data values 915h and 915j. The difference of the data value corresponding to a greater Z-coordinate from the data value corresponding to a smaller Z-coordinate is calculated for each of the above pairs, so that the differences of 0.5, 0.4, 0.5, 0.3, 0.5, 0.4, 0.2, and 0.5 are obtained for the respective pairs. Then, the average value of the above differences, 0.41 (≈(0.5+0.4+0.5+0.3+ 0.5+0.4+0.2+0.5)/8), is obtained as the variation rate in the direction of the Z-axis.

Similarly, the variation rate in the direction of the time axis is calculated as follows. In the spatial data table 910, the pairs of data values corresponding to two time values differing by one from each other and identical X-, Y-, and Z-coordinates include the pair of the data values 915a and 915k, the pair of the data values 915b and 915m, and the pair of the data values 915c and 915p. The difference of the data value corresponding to a greater time value from the data value corresponding to a smaller time value is calculated for each of the above pairs, so that the differences of 0.2 (=1.9−1.7), −0.1 (=2.1− 2.2), and 0 (=2.6−2.6) are obtained for the respective pairs. Then, the average value of the above differences, 0.03 (≈(0.2− 0.1+0)/3), is obtained as the variation rate in the direction of the time axis.

The above calculation results of the variation rates in the directions of the respective axes based on the data values in the spatial data table 910 show that only the variation rate in the direction of the Z-axis is particularly high compared with the variation rates in the directions of the other axes. That is, the above results show that the data values in the spatial data table 910 are based on a unidimensionality model. Therefore, in this example, a determination whether to record data is made on the basis of the variation rate in the direction of the Z-axis for which the variation rate is high.

Since the variation rates can be a negative value in some cases as the variation rate in the direction of the Y-axis in the above example, the absolute value of each variation rate, instead of the variation rate per se, may be used in processing. In this case, the number of data items can be reduced by using the absolute value of the variation rate in the direction of each axis regardless of the polarity of the variation rate.

Next, bidimensionality and a bidimensionality model are explained.

Figure 8:
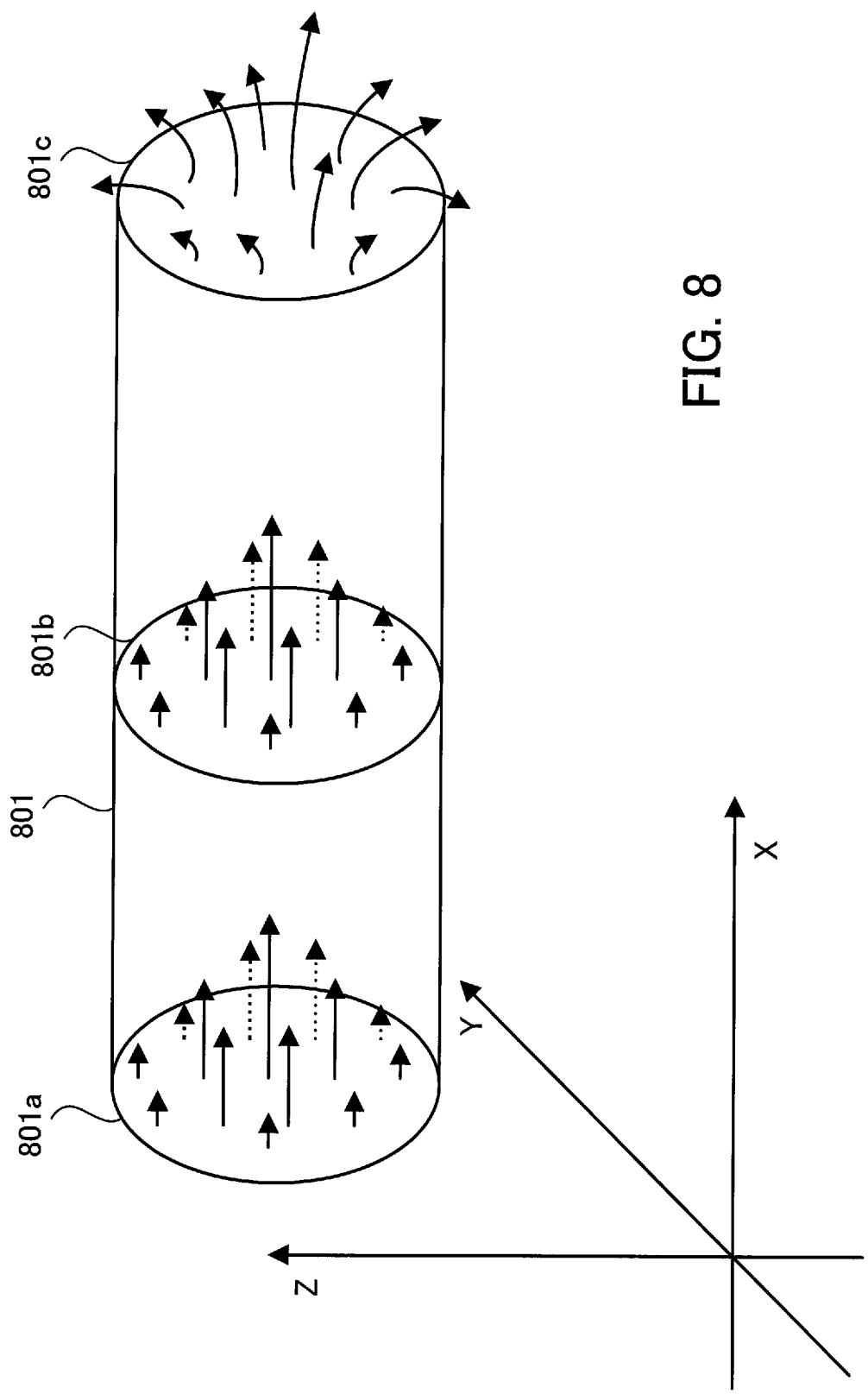
FIG. 8 is a diagram illustrating an example of a bidimensionality model.

FIG. 8 is a diagram illustrating an example of a bidimensionality model. The bidimensionality model according to the present embodiment is a model in which great variations in bidimensional directions occur in a space, for example, as in the case of fluid flowing in a tube (where variations occur in the directions parallel to the cross sections of the tube). In the bidimensionality model, importance is given to the variation rates in the bidimensional directions and the direction of the time axis.

In FIG. 8, the magnitudes of a physical quantity are indicated by the lengths of the filled arrows. In the example of FIG. 8, the lengths of the filled arrows greatly vary in correspondence with displacement in the Y-axis and Z-axis directions until the fluid flowing through a tube 801 is discharged from the cross section 801c. The lengths of the filled arrows indicated in FIG. 8 decrease with increase in the distances of the positions of the filled arrows (indicated by the Y- and the Z-coordinates) from the center of the cross sections 801a and 801b. On the other hand, the lengths of the filled arrows hardly vary with displacement in the X-axis direction.

As explained above, in the bidimensionality model, the variations of the physical quantity with displacement in bidimensional directions in the space (e.g., in the directions of the Y-axis and the Z-axis in the example of FIG. 8) are great, while the variations of the physical quantity with displacement in the direction of the other dimensional axis (e.g., in the X-axis direction in the example of FIG. 8) are small.

A spatial data table for a bidimensionality model, which the data recording apparatus 100 has, is explained below.

FIG. 9 is a diagram illustrating an example of a data structure of a spatial data table in the case of a bidimensionality model. In the spatial data table 920, similarly to the spatial data table 910, an example of a data set which is acquired as a result of execution of a simulation in the case of a bidimensionality model is tabulated by the recording unit 118, and stored as the data table 121. The spatial data table 920 has a field 921 of "TIME," a field 922 of "X-AXIS," a field 923 of "Y-AXIS," a field 924 of "Z-AXIS," and a field 925 of "OUTPUT." The information items tabulated in each row of the spatial data table 920 are associated with each other, and constitute a set of multidimensional data.

The variation rates in the directions of the axes (i.e., the axial data variation rates) in a bidimensionality model are explained below on the basis of an example of data stored in the spatial data table 920.

In the case where the variation rate in the direction of the X-axis is calculated in a similar manner to the case of the unidimensionality model, the pairs of data values corresponding to two X-coordinates differing by one from each other and identical Y-, Z-, and time coordinates include the pair of the data values 925a and 925g, the pair of the data values 925b and 925h, and the pair of the data values 925c and 925j. The difference of the data value corresponding to a greater X-coordinate from the data value corresponding to a smaller X-coordinate is calculated for each of the above pairs, so that the differences of 0 (=0.8−0.8), 0.1 (=1.3−1.2), and 0.1 (=1.7− 1.6) are obtained for the respective pairs. Then, the average value of the above differences, 0.07 (≈(0+0.1+0.1)/3), is obtained as the variation rate in the direction of the X-axis.

Similarly, the variation rate in the direction of the Y-axis is calculated as follows. In the spatial data table 920, the pairs of data values corresponding to two Y-coordinates differing by one from each other and identical X-, Z-, and time coordinates include the pair of the data values 925a and 925d, the pair of the data values 925b and 925e, and the pair of the data values 925c and 925f. The difference of the data value corresponding to a greater Y-coordinate from the data value corresponding to a smaller Y-coordinate is calculated for each of the above pairs, so that the differences of 0.4 (=1.2−0.8), 0.6 (=1.8−1.2), and 0.8 (=2.4−1.6) are obtained for the respective pairs. Then, the average value of the above differences, 0.6 (=(0.4+0.6+ 0.8)/3), is obtained as the variation rate in the direction of the Y-axis.

Similarly, the variation rate in the direction of the Z-axis is calculated as follows. In the spatial data table 920, the pairs of data values corresponding to two Z-coordinates differing by one from each other and identical X-, Y-, and time coordinates include the pair of the data values 925a and 925b, the pair of the data values 925b and 925c, the pair of the data values 925d and 925e, the pair of the data values 925e and 925f, the pair of the data values 925g and 925h, and the pair of the data values 925h and 925j. The difference of the data value corresponding to a greater Z-coordinate from the data value corresponding to a smaller Z-coordinate is calculated for each of the above pairs, so that the differences of 0.4, 0.4, 0.6, 0.6, 0.5, 0.4, 0.2, and 0.5 are obtained for the respective pairs. Then, the average value of the above differences, 0.45 ($\approx$(0.4+0.4+0.6+0.6+0.5+0.4+0.2+0.5)/8), is obtained as the variation rate in the direction of the Z-axis.

Similarly, the variation rate in the direction of the time axis is calculated as follows. In the spatial data table 920, the pairs of data values corresponding to two time values differing by one from each other and identical X-, Y-, and Z-coordinates include the pair of the data values 925a and 925k, the pair of the data values 925b and 925m, and the pair of the data values 925c and 925p. The difference of the data value corresponding to a greater time value from the data value corresponding to a smaller time value is calculated for each of the above pairs, so that the differences of 0.1 (=0.9−0.8), −0.1 (=1.1−1.2), and 0 (=1.6−1.6) are obtained for the respective pairs. Then, the average value of the above differences, 0 (=(0.1−0.1+0)/3), is obtained as the variation rate in the direction of the time axis.

The above calculation results of the variation rates in the directions of the respective axes based on the data values in the spatial data table 920 show that only the variation rates in the directions of the Y-axis and the Z-axis are particularly high compared with the variation rates in the direction of the other axis. That is, the above results show that the data values in the spatial data table 920 are based on a bidimensionality model.

Therefore, in this example, a determination whether to record data is made on the basis of the variation rates in the directions of the Y-axis and the Z-axis. In the case where the condition "AND" is set as the condition for determination (as indicated in FIGS. 4 and 5), the data is recorded only when the variation rates in the directions of both of the Y-axis and the Z-axis are equal to or higher than the corresponding thresholds (as indicated in FIGS. 4 and 5). In the case where the condition "OR" is set as the condition for determination, the data is recorded when the variation rate in the direction of one of the Y-axis and the Z-axis is equal to or higher than the corresponding threshold. Further, in the case where either of the Y-axis and the Z-axis is a designated axis (as indicated in FIGS. 4 and 5), the data is recorded when the variation rate in the direction of the designated axis is equal to or higher than the threshold corresponding to the designated axis.

Next, tridimensionality and a tridimensionality model are explained.

Figure 10:
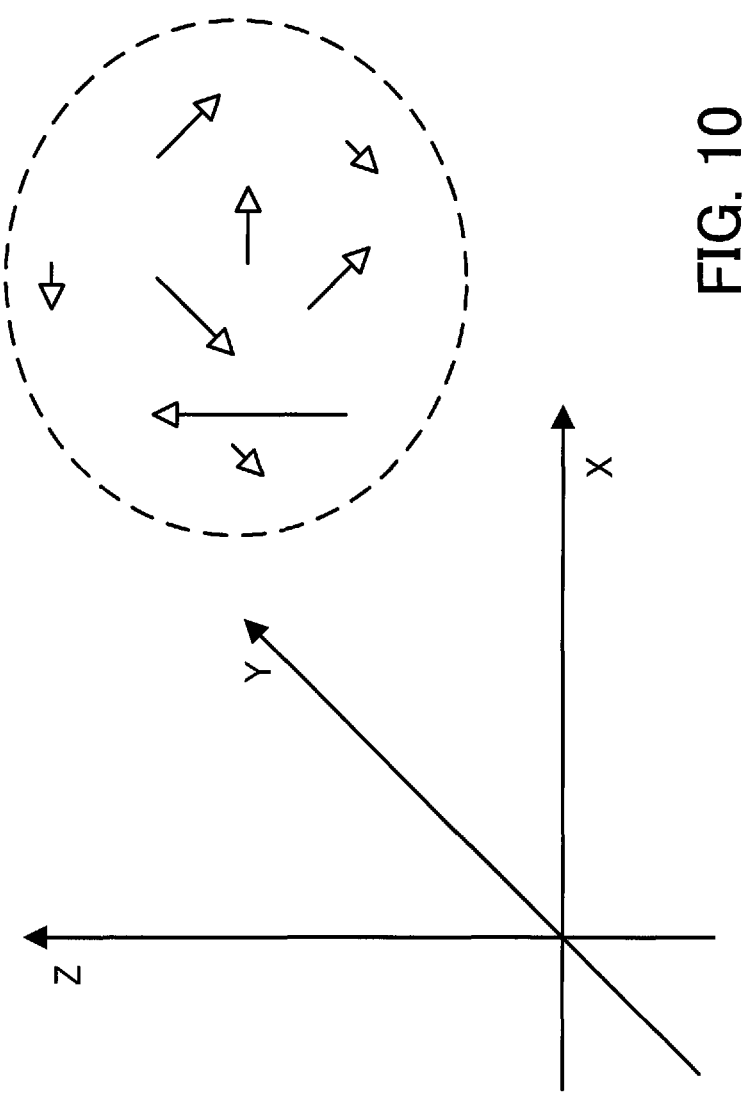
FIG. 10 is a diagram illustrating an example of a tridimensionality model.

FIG. 10 is a diagram illustrating an example of a tridimensionality model. The tridimensionality model according to the present embodiment is a model in which great variations in tridimensional directions occur in a space. In the tridimensionality model, importance is given to the variation rates in the tridimensional directions and the direction of the time axis.

In FIG. 10, the magnitudes of a physical quantity are indicated by the lengths of the hollow arrows. In the example of FIG. 10, the lengths of the hollow arrows greatly vary in correspondence with displacement in the directions of the X-, Y-, and Z-axes.

As explained above, in the tridimensionality model, the variations of the physical quantity with displacement in all spatial directions (e.g., in the directions of the X-, Y-, and Z-axes) are great.

A spatial data table for a tridimensionality model, which the data recording apparatus 100 has, is explained below.

FIG. 11 is a diagram illustrating an example of a data structure of a spatial data table in the case of a tridimensionality model. In the spatial data table 930, similarly to the spatial data table 910, an example of a data set which is acquired as a result of execution of a simulation in the case of a tridimensionality model is tabulated by the recording unit 118, and stored as the data table 121. The spatial data table 930 has a field 931 of "TIME," a field 932 of "X-AXIS," a field 933 of "Y-AXIS," a field 934 of "Z-AXIS," and a field 935 of "OUTPUT." The information items tabulated in each row of the spatial data table 930 are associated with each other, and constitute a set of multidimensional data.

The variation rates in the directions of the axes (i.e., the axial data variation rates) in a tridimensionality model are explained below on the basis of an example of data stored in the spatial data table 930.

In the case where the variation rate in the direction of the X-axis is calculated in a similar manner to the case of the unidimensionality model, the pairs of data values corresponding to two X-coordinates differing by one from each other and identical Y-, Z-, and time coordinates include the pair of the data values 935a and 935g, the pair of the data values 935b and 935h, and the pair of the data values 935c and 935j. The difference of the data value corresponding to a greater X-coordinate from the data value corresponding to a smaller X-coordinate is calculated for each of the above pairs, so that the differences of 0.6 (=2.3−1.7), 1.9 (=2.4−0.5), and −0.7 (=0.6−1.3) are obtained for the respective pairs. Then, the average value of the above differences, 0.6 ($\approx$(0.6+1.9−0.7)/3), is obtained as the variation rate in the direction of the X-axis.

Similarly, the variation rate in the direction of the Y-axis is calculated as follows. In the spatial data table 930, the pairs of data values corresponding to two Y-coordinates differing by one from each other and identical X-, Z-, and time coordinates include the pair of the data values 935a and 935d, the pair of the data values 935b and 935e, and the pair of the data values 935c and 935f. The difference of the data value corresponding to a greater Y-coordinate from the data value corresponding to a smaller Y-coordinate is calculated for each of the above pairs, so that the differences of −0.9 (=0.8−1.7), 0.9 (=1.4−0.5), and 1.8 (=2.7−0.9) are obtained for the respective pairs. Then, the average value of the above differences, 0.6 ($\approx$(−0.9+0.9+1.8)/3), is obtained as the variation rate in the direction of the Y-axis.

Similarly, the variation rate in the direction of the Z-axis is calculated as follows. In the spatial data table 930, the pairs of data values corresponding to two Z-coordinates differing by one from each other and identical X-, Y-, and time coordinates include the pair of the data values 935a and 935b, the pair of the data values 935b and 935c, the pair of the data values 935d and 935e, the pair of the data values 935e and 935f, the pair of the data values 935g and 935h, and the pair of the data values 935h and 935j. The difference of the data value corresponding to a greater Z-coordinate from the data value corresponding to a smaller Z-coordinate is calculated for each of the above pairs, so that the differences of −1.2, 0.8, 0.6, 1.3, 0.1, −1.8, 1.3, and 2.4 are obtained for the respective pairs. Then, the average value of the above differences, 0.44 ($\approx$(−1.2+0.8+0.6+1.3+0.1−1.8+1.3+2.4)/8), is obtained as the variation rate in the direction of the Z-axis.

Similarly, the variation rate in the direction of the time axis is calculated as follows. In the spatial data table 930, the pairs of data values corresponding to two time values differing by one from each other and identical X-, Y-, and Z-coordinates include the pair of the data values 935a and 935k, the pair of the data values 935b and 935m, and the pair of the data values 935c and 935p. The difference of the data value corresponding to a greater time value from the data value corresponding to a smaller time value is calculated for each of the above pairs, so that the differences of −1.6 (=0.1−1.7), 0.9 (=1.4−0.5), and 2.5 (=3.8−1.3) are obtained for the respective pairs. Then, the average value of the above differences, 0.6 (=(−1.6+0.9+2.5)/3), is obtained as the variation rate in the direction of the time axis.

The above calculation results of the variation rates in the directions of the respective axes based on the data values in the spatial data table 930 show that the variation rates in all the spatial directions are high. That is, the above results show that the data values in the spatial data table 930 are based on a tridimensionality model. Since the variation rates corresponding to all the axes are high in the above example, none of the axes is excluded from the objective axes (which are the objects of the calculation of the variation rates for determining whether to record data). Therefore, it is impossible to lighten, by the dimensionality investigation, the burden of calculation for determining whether to record data. However, for example, in the case where the variation rate in the direction of the time axis is low, the burden of the above calculation can be lightened by excluding the time axis from the objective axes. Further, even in the case where one or more axes are designated by the user, the variation rates in the direction or directions of an axis or axes other than the one or more designated axes are not calculated, so that the burden of the above calculation can be lightened.

As explained above, in the above example, the data recording apparatus 100 determines whether to record data, on the basis of variation rates in the directions of all the spatial axes. At this time, in the case where the condition "AND" is set as the condition for determination (as indicated in FIGS. 4 and 5), the data is recorded only when the variation rates in the directions of all the spatial axes are equal to or higher than the corresponding thresholds (as indicated in FIGS. 4 and 5). In the case where the condition "OR" is set as the condition for determination, the data is recorded when the variation rate in the direction of one of the spatial axes is equal to or higher than the corresponding threshold.

In the case where at least one of the spatial axes is designated by the user (as indicated in FIGS. 4 and 5), the data is recorded when the variation rate or rates in the direction or directions of the at least one designated axis are equal to or higher than one or more thresholds corresponding to the at least one designated axis. Further, in the case where a plurality of designated axes exist, processing is performed in accordance with a condition for determination which is similarly set.

The effect of lightening of the burden of calculation by the data recording apparatus 100 according to the present embodiment is explained below. In the following calculation, the number of lattice points is $M^3$, the total number of steps is U, the number of steps for performing analysis of the dimensionality is D, and the number of steps not including the processing related to one or more axes each corresponding to a low variation rate is S (=U−D).

In this case, the load imposed by the dimensionality investigation 501 can be expressed by the following formula (17), where the load necessarily caused by calculation of a variation rate at a lattice point is denoted by a.

$$A = aM^3 D \quad (17)$$

For example, in the case where the object of the simulation is a bidimensionality model, and the variation rate corresponding to an axis is found by the dimensionality investigation 501 (indicated by FIG. 5) to be low, the load caused by execution of the S steps not including the processing related to one or more axes each corresponding to a low variation rate is expressed by the following formula (18).

$$B = aM^3 S = aM^2 (U - D) \quad (18)$$

On the other hand, in the case where the analysis of the dimensionality is not performed, and the calculation of the variation rates is performed in all the steps, the load caused by the calculation is expressed by the following formula (19).

$$C = aM^3 U \quad (19)$$

The ratio R of the load in the case where the dimensionality investigation 501 is performed to the load in the case where the dimensionality investigation 501 is not performed is (A+B)/C. Therefore, the ratio R can be obtained by the following formula (20).

$$R = \frac{aM^3 D + aM^2(U-D)}{aM^3 U} = \frac{D}{U} + \frac{1}{M}\left(1 - \frac{D}{U}\right) \quad (20)$$

For example, in the case where the number D of steps for performing the dimensionality analysis is 20% of the total number U of steps (i.e., D/U=0.2), and the number of lattice points per axis is M (i.e., M=100), the ratio R becomes as indicated in the equation (21).

$$R = 0.2 + \frac{0.8}{100} = 0.208 \quad (21)$$

That is, the load in the above case is 0.208 times the load in the case where the dimensionality investigation 501 is not performed. The above estimation shows that the load can be reduced by performing analysis of the dimensionality.

In addition, in the case where M is great in the formula (20), the second term $1/M \cdot (1-D/U)$ of the right side of the formula (20) can be ignored. (In the above example, $1/M \cdot (1-D/U) = 0.8/100$.) In other words, the ratio R is determined mainly by the first term D/U of the right side of the formula (20). Therefore, the effect of the dimensionality investigation 501 increases with decrease in the number D of the steps of the dimensionality investigation 501. Further, the difference between the unidimensionality and bidimensionality in the model is included in the second term. (In the case of the unidimensionality model, the denominator is $M^2$, instead of M.) Therefore, in the case where M is great, the second term can be ignored, so that the difference in the dimensionality does not affect the burden of calculation. However, in the case where M is not great, the second term cannot be ignored, so that the difference in the dimensionality affects the burden of calculation to some degree.

In the case where the physical space on which the simulation is performed is a three-dimensional space, the timestep, the X-, Y-, and Z-coordinates, and one or more physical quantities at the coordinates are stored in the spatial data table. The one or more physical quantities are data indicating the pressure, velocity, density, and the like. In the case where the physical space is three-dimensional, and the number of elements in each dimension is 1000, a memory space of $10^9$ lines for each step is necessary. In the case where the dimensionality of a physical phenomenon is investigated, data corresponding to a multiple of the number of steps are further stored in the spatial data table. However, it is unnecessary to store the data for all the steps in the spatial data table. In the data recording apparatus 100 according to the present embodiment, unnecessary data of the past are overwritten by data of new timesteps. Alternatively, the data recording apparatus 100 may be configured so that unnecessary data which are once recorded are thereafter deleted on the basis of a result of a determination.

Next, processing for having as an input a table with a construction and a data structure which are explained above and determining data to be outputted is explained below.

Figure 12:
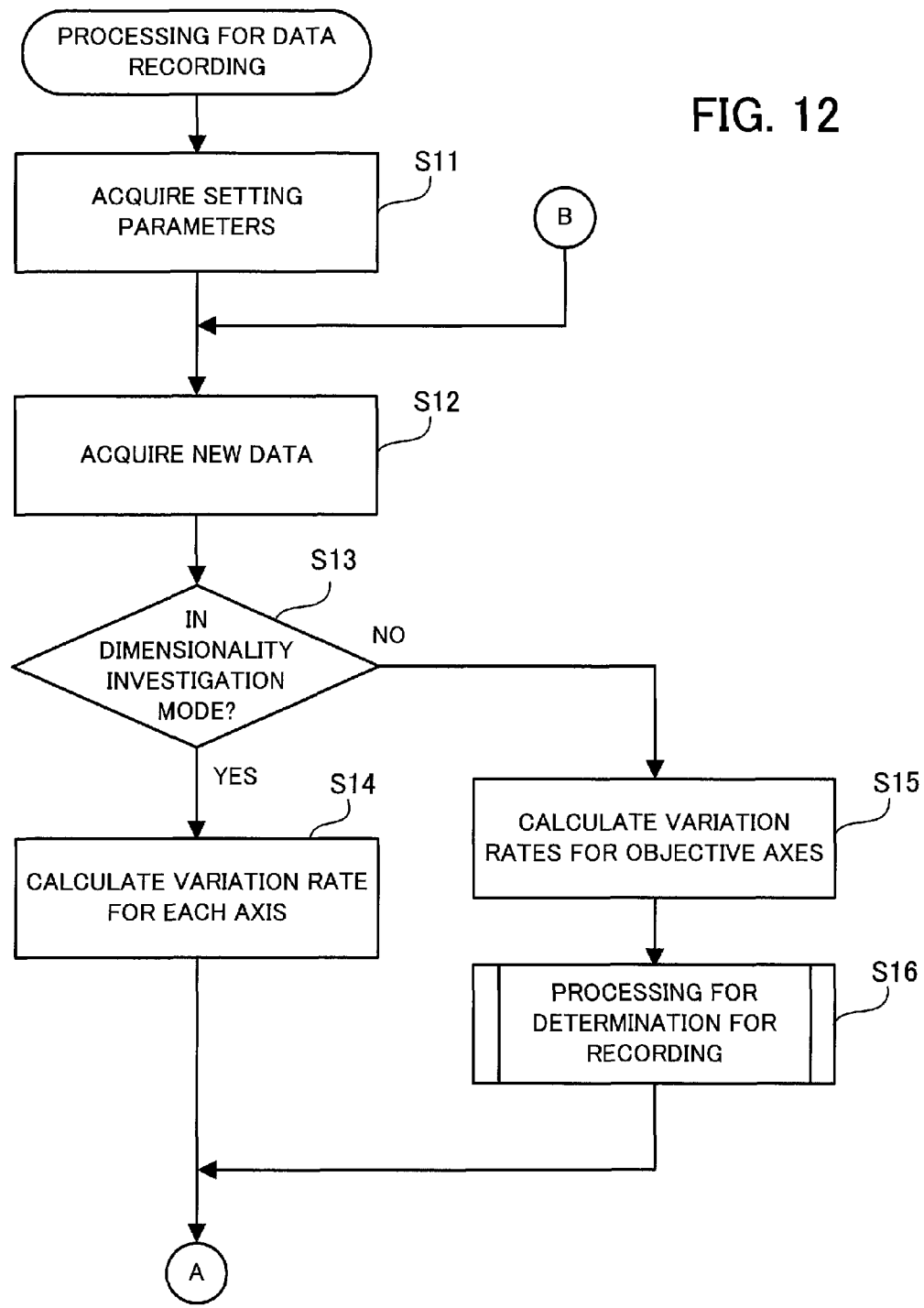
FIG. 12 is a flow diagram indicating (the first half of) a sequence of data recording processing.
Figure 13:
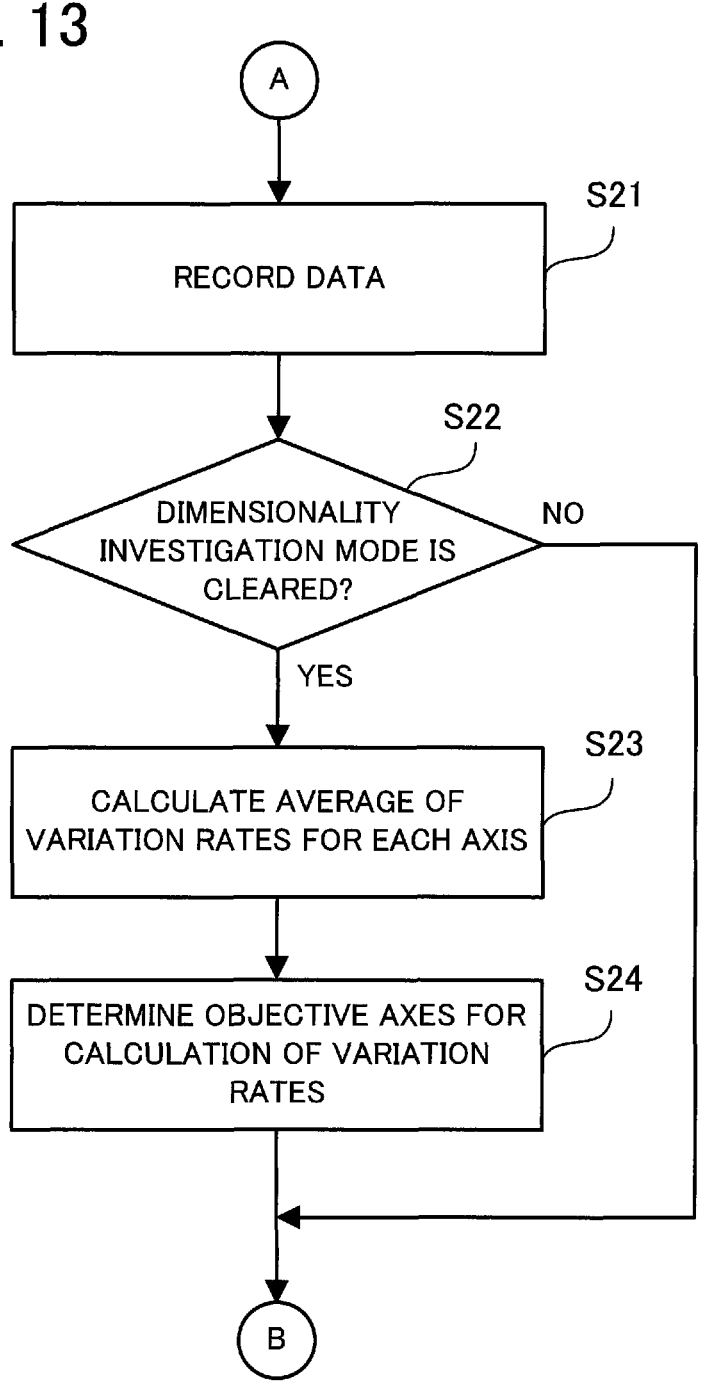
FIG. 13 is a flow diagram indicating (the second half of) a sequence of the data recording processing.

FIGS. 12 and 13 are flow diagrams indicating a sequence of data recording processing. The processing of FIGS. 12 and 13 is explained below step by step.

<Step S11> The setting-information acquisition unit 119 receives the setting information 210 (which is inputted by the user), and acquires setting parameters from the received setting information 210. Then, the setting parameter table 701 is constituted by the setting information 210, and stored in the RAM 102. Thereafter, the setting information 210 is read out when necessary.

<Step S12> The data acquisition unit 111 acquires data which is calculated as a result of execution of a new step of the simulation.

<Step S13> The mode setting unit 112 sets the data recording apparatus 100 to a dimensionality investigation mode in accordance with a predetermined condition. In the case where the predetermined condition is satisfied and the data recording apparatus 100 is set to the dimensionality investigation mode, or in the case where the data recording apparatus 100 is already set in the dimensionality investigation mode, the operation goes to step S14. On the other hand, in the case where the data recording apparatus 100 is out of the dimensionality investigation mode, the operation goes to step S15.

<Step S14> The axis-determinative variation-rate calculation unit 113 calculates axial data variation rates corresponding to the spatial axes and the time axis. As explained later, an average value of the axial data variation rates corresponding to each axis and being calculated in this step is calculated in step S23.

<Step S15> The recording-determinative variation-rate calculation unit 116 calculates axial data variation rates corresponding to one or more objective axes. As explained later, the axial data variation rates calculated in this step is used in step S16 for determining whether to record data.

<Step S16> The recording determination unit 117 executes recording determination processing, details of which are explained later with reference to FIGS. 14 and 15.

<Step S21> The recording unit 118 records data in the data table 121. In the case where the data recording apparatus 100 is in the dimensionality investigation mode, data indicating a physical quantity of which the variation rate is calculated in step S14 is recorded. On the other hand, in the case where the data recording apparatus 100 is out of the dimensionality investigation mode, data indicating a physical quantity which is determined in step S16 to be recorded, on the basis of the variation rate calculated in step S15, is recorded.

<Step S22> The mode setting unit 112 clears the setting of the dimensionality investigation mode in accordance with the predetermined condition. In the case where the predetermined condition is satisfied and the dimensionality investigation mode is cleared, the operation goes to step S23. On the other hand, in the case where the data recording apparatus 100 is still set in the dimensionality investigation mode, or in the case where the data recording apparatus 100 is already out of the dimensionality investigation mode, the operation goes to step S12.

<Step S23> The axis-determinative variation-rate calculation unit 113 calculates an average value of the variation rates being calculated in step S14 and corresponding to each axis on the basis of the variation rates obtained in correspondence with the axis on a step-by-step basis (as indicated in FIG. 5).

Figure 14:
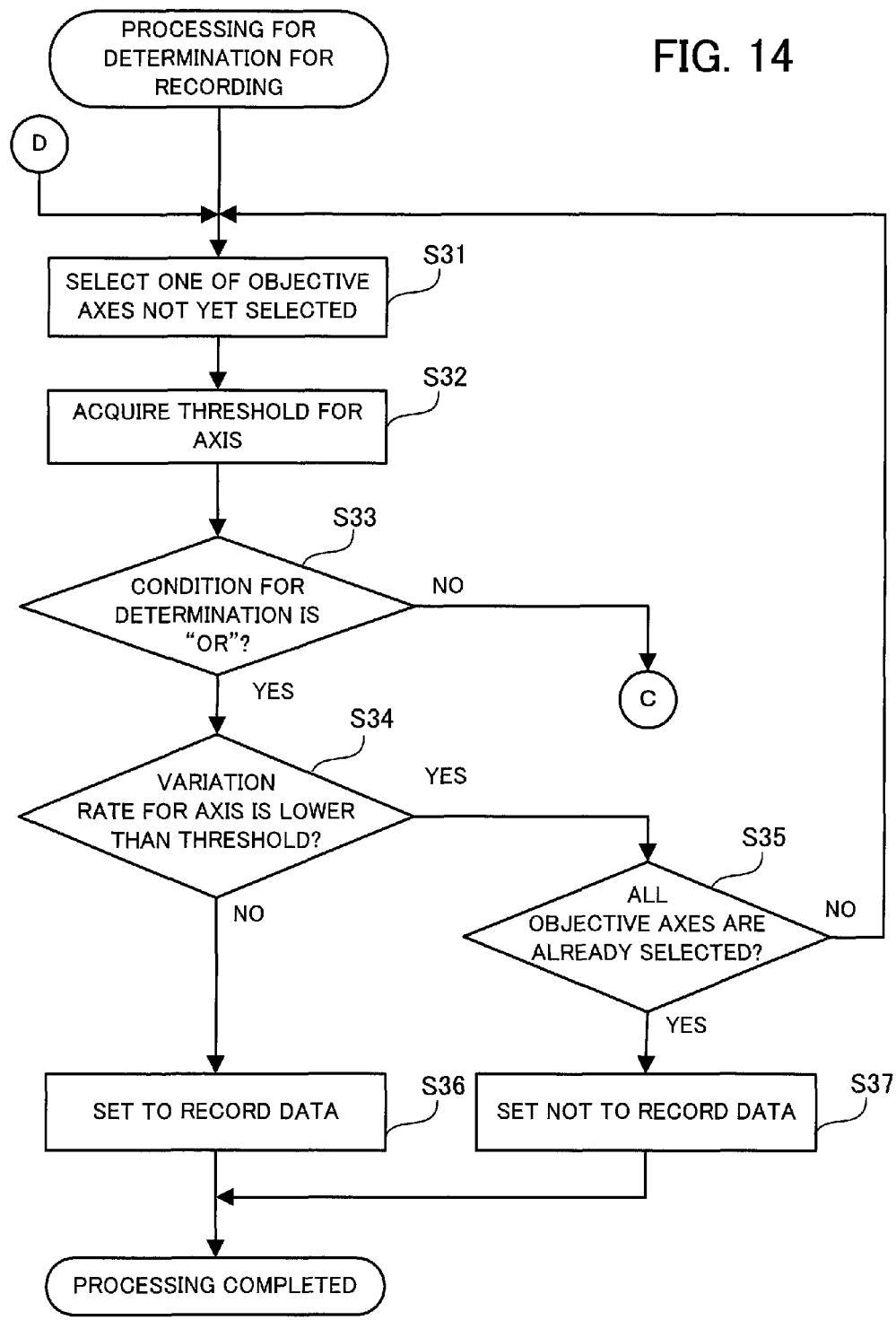
FIG. 14 is a flow diagram indicating (the first half of) a sequence of recording determination processing.
Figure 15:
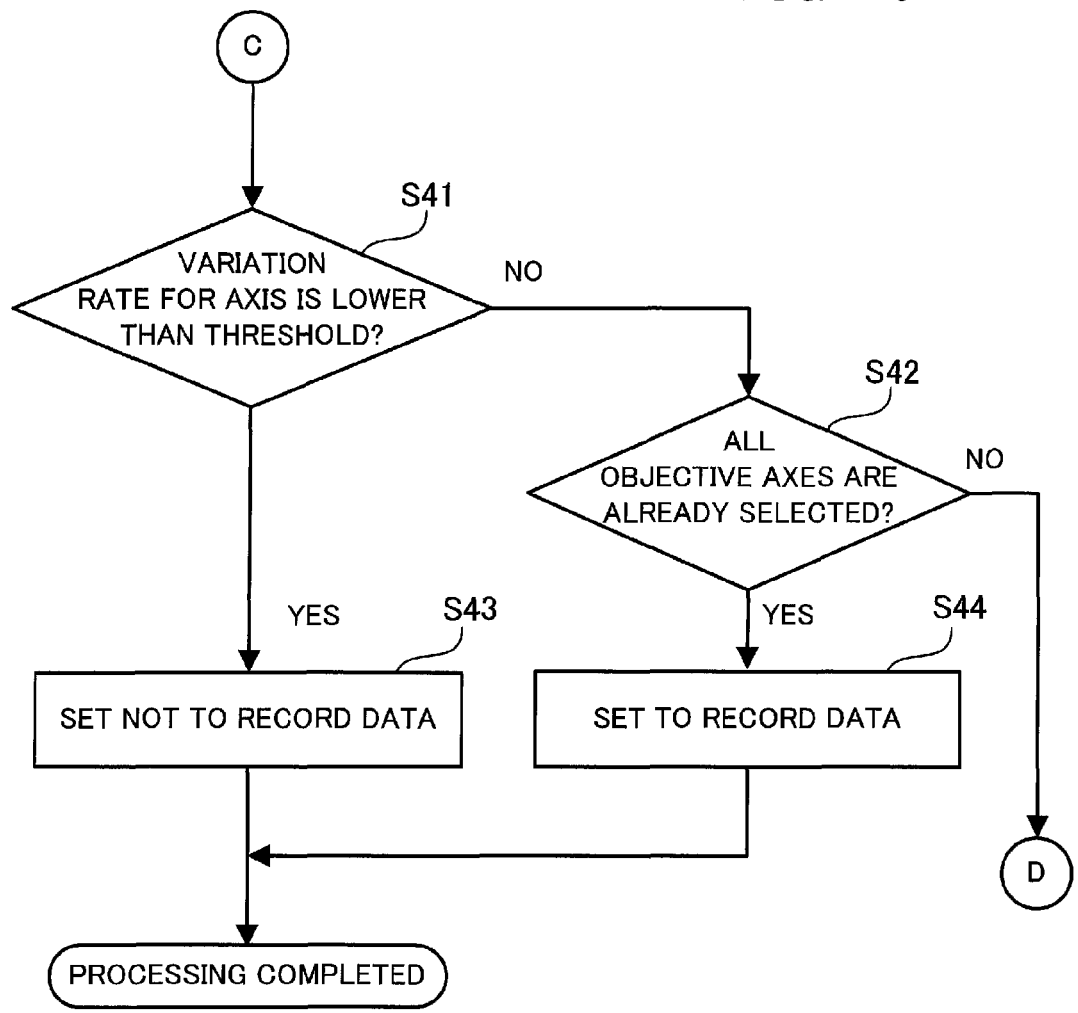
FIG. 15 is a flow diagram indicating (the second half of) a sequence of the recording determination processing.

<Step S24> The axis determination unit 114 determines one or more objective axes for which calculation of variation rates is to be performed for use in the recording determination processing (which is indicated in FIGS. 14 and 15 and in which a determination whether to record data is made), on the basis of the average value of the variation rates corresponding to each axis and being calculated in step S23 (as indicated in FIG. 5).

FIGS. 14 and 15 are flow diagrams indicating a sequence of recording determination processing, which is performed in step S16 in the data recording processing (indicated in FIGS. 12 and 13). The processing of FIGS. 14 and 15 is explained below step by step.

<Step S31> The recording determination unit 117 selects one of the one or more objective axes which is not yet selected in the data currently subject to the recording determination processing.

<Step S32> The recording determination unit 117 acquires a threshold corresponding to the axis selected in step S31, from the setting parameters (indicated in FIG. 4) which is acquired in step S11 (in FIG. 12).

<Step S33> The recording determination unit 117 acquires a condition for determination from the setting parameters acquired in step S11, and determines whether or not the acquired condition for determination is the condition "OR." When the acquired condition for determination is the condition "OR," the operation of the recording determination unit 117 goes to step S34. When no is determined, and the acquired condition for determination is the condition "AND," the operation goes to step S41 (in FIG. 15).

<Step S34> The recording determination unit 117 determines whether or not the axial data variation rate corresponding to the axis selected in step S31 is lower than the threshold acquired in step S32. When the axial data variation rate is lower than the threshold, the operation of the recording determination unit 117 goes to step S35. When the axial data variation rate is equal to or higher than the threshold, the operation goes to step S36.

<Step S35> The recording determination unit 117 determines whether or not all of the one or more objective axes in the data currently subject to the recording determination processing are already selected in step S31. When yes is determined, the operation goes to step S37. When no is determined, the operation goes to step S31.

<Step S36> The recording determination unit 117 sets the data recording apparatus 100 so as to record the data currently subject to the recording determination processing, and thereafter the processing is completed.

<Step S37> The recording determination unit 117 sets the data recording apparatus 100 so as not to record the data currently subject to the recording determination processing, and thereafter the processing is completed.

<Step S41> The recording determination unit 117 determines whether or not the axial data variation rate corresponding to the axis selected in step S31 is lower than the threshold acquired in step S32. When the axial data variation rate is lower than the threshold, the operation of the recording determination unit 117 goes to step S43. When the axial data variation rate is equal to or higher than the threshold, the operation goes to step S42.

<Step S42> The recording determination unit 117 determines whether or not all of the one or more objective axes in the data currently subject to the recording determination processing are already selected in step S31. When yes is determined, the operation goes to step S44. When no is determined, the operation goes to step S31 (in FIG. 14).

<Step S43> The recording determination unit 117 sets the data recording apparatus 100 so as not to record the data currently subject to the recording determination processing, and thereafter the processing is completed.

<Step S44> The recording determination unit 117 sets the data recording apparatus 100 so as to record the data currently subject to the recording determination processing, and thereafter the processing is completed.

As explained above, while the data recording apparatus 100 is out of the dimensionality investigation mode, the recording determination unit 117 determines whether to record each set of data, on the basis of the setting information 210 stored in the setting parameter table 701.

When the data recording apparatus 100 explained as above is used, the data recording apparatus 100 determines whether or not the acquired data is to be recorded, according to the variations in the direction of each axis. Specifically, the axial data variation rates indicating the rates of variations of data in axial directions corresponding to displacement in the direction of each axis are calculated in advance. Then, one or more of a plurality of axes constituting a multidimensional data and each having a direction in which axial data variation rate is low is excluded from the condition for the determination as to whether to record the acquired data, and calculation of the axial data variation rate is not performed on the one or more excluded axes. Therefore, it is possible to save the storage capacity for storing the data, and reduce the amount of calculation of the variation rates. Since the storage capacity can be saved and the burden of calculation for reducing the amount of data can be suppressed, the data recording apparatus 100 is very useful for simplification of the simulation system and reduction in the operational cost.

Especially, the data handled in simulations of a phenomenon occurring in a physical space are multidimensional. According to the present embodiment, the axes for which the variation rates are to be calculated are limited by determining the dimensionality of the model. Thereafter, the spatial variation rates (corresponding to the X-, Y-, and Z-axes in a three-dimensional space) and timewise variation rates (corresponding to the time axis) are obtained on a point-by-point basis in the physical space, and only the noticeable data of which the timewise or spatial variation rate or rates are high are extracted. Therefore, for example, even in the case where the model has a large-scale physical space, it is possible to reduce the increase in the burden of calculation associated with increase in the scale of the model.

The processing functions according to the present embodiment which are explained above can be realized by a computer. In this case, a program describing details of the functions which the data recording apparatus 100 should have is provided. When a computer executes the program, the processing functions of the data recording apparatus 100 can be realized on the computer. The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape (MT), or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

According to the embodiment, it is determined whether to record the acquired data, according to the displacement in the direction of each axis. Specifically, the axial data variation rate indicating the rate of variation in the acquired data corresponding to displacement in the direction of each axis is calculated in advance. When one or more axial data variation rates corresponding to one or more of the plurality of axes which constitute the multidimensional space are low, the one or more of the plurality of axes are excluded from the condition for determining whether to record the acquired data, and the axial data variation rates corresponding to the one or more axes are not calculated. Therefore, the storage capacity necessary for storing data can be saved, and the amount of calculation of the data variation rates can be reduced. That is, the capacity of the storage device for storing data can be saved, and the burden of calculation for reducing data can be suppressed. Consequently, the present invention is very useful for simplifying the simulation system and reducing the operational cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions and alterations could be made hereto without departing from the spirit and scope of the invention.

What is claimed is:

1. A computer-readable, non-transitory medium storing a data recording program for use in simulations, including molecular simulation and global warming simulation, where data varies with time in a space constituted by dimensional axes, the data recording program, when executed by a computer, causing the computer to perform a procedure comprising:

acquiring data varying with displacement in a direction of each of the dimensional axes and time indicated by a time axis, in correspondence with the time axis and each of the dimensional axes;

setting the computer in a dimensionality investigation mode for determining, based on magnitudes of variations of the data in axial directions, one or more objective axes to be one or more objects of investigation as to dimensionality;

calculating an axial data variation rate indicating a rate of variation in the acquired data corresponding to displacement in a direction of each of the dimensional axes and the time axis, while the computer is in the dimensionality investigation mode;

comparing the calculated axial data variation rates respectively with thresholds corresponding to the dimensional axes and the time axis;

selecting one or more of the dimensional axes and the time axis as one or more objective axes when one or more axial data variation rates corresponding to the one or more of the dimensional axes and the time axis are determined to be equal to or higher than the corresponding thresholds, while rejecting the others of the dimensional axes and the time axis whose corresponding axial data variation rates are determined to be lower than the corresponding thresholds;

clearing setting of the dimensionality investigation mode;

calculating an objective axial data variation rate indicating a rate of variation in the acquired data corresponding to displacement in a direction of each of the one or more objective axes, while the computer is out of the dimensionality investigation mode;

determining whether to record data varying with displacement in a direction of the objective axes, based on the calculated objective axial data variation rates; and recording in a data table the data that is determined to be recorded, and not recording in the data table the data that is determined not to be recorded.

2. The computer-readable, non-transitory medium according to claim 1, wherein:

the calculating of the axial data variation rates obtains the axial data variation rate corresponding to each of the dimensional axes by calculating an average value per unit time of variation rates of data varying with displacement in a direction of each of the dimensional axes, and the calculating of the objective axial data variation rates obtains the objective axial data variation rate corresponding to each of the objective axes by calculating an average value per unit time of variation rates of data varying with displacement in the direction of each of the objective axes.

3. The computer-readable, non-transitory medium according to claim 1, wherein:

the thresholds corresponding to the dimensional axes and the time axis are also applicable to the objective axes, and the determining of whether to record the data compares the one or more objective axial data variation rates corresponding to the one or more objective axes respectively with one or more of the thresholds corresponding to the one or more objective axes, and determines not to record the data in the data table when the objective axial data variation rate corresponding to at least one of the one or more objective axes is lower than the corresponding threshold.

4. The computer-readable, non-transitory medium according to claim 3, wherein:

the procedure further comprises receiving an input that designates axes from among the dimensional axes and the time axis, and the comparing compares the first axial data variation rates corresponding only to the designated axes with the thresholds corresponding thereto.

5. The computer-readable, non-transitory medium according to claim 4, wherein the calculating of the first axial data variation rates obtains the first axial data variation rates corresponding only to the designated axes by calculating an average value per unit time of variation rates of the data in a direction of each of the designated axes, and the calculating of the objective axial data variation rates obtains each of the one or more objective axial data variation rates corresponding to the one or more objective axes by calculating an average value per unit time of variation rates of the data in the direction of one of the one or more objective axes.

6. The computer-readable, non-transitory medium according to claim 1, wherein:

the thresholds corresponding to the dimensional axes and the time axis are also applicable to the objective axes, and the determining of whether to record the data compares the one or more objective axial data variation rates corresponding to the one or more objective axes respectively with one or more of the thresholds corresponding to the one or more objective axes, and determines not to record the data in the data table when one or more objective axial data variation rates corresponding to all of the one or more objective axes are lower than one or more corresponding thresholds.

7. The computer-readable, non-transitory medium according to claim 6, wherein:

the procedure further comprises receiving an input that designates axes from among the dimensional axes and the time axis, the comparing compares the first axial data variation rates corresponding only to the designated axes with the thresholds corresponding thereto.

8. The computer-readable, non-transitory medium according to claim 7, wherein the calculating of the first axial data variation rates obtains the first axial data variation rates corresponding only to the designated axes by calculating an average value per unit time of variation rates of the data varying with displacement in a direction of each of the designated axes, and the calculating of the objective axial data variation rates obtains each of the one or more objective axial data variation rates corresponding to the one or more objective axes by calculating an average value per unit time of variation rates of data varying with displacement in a direction of one of the one or more objective axes.

9. The computer-readable, non-transitory medium according to claim 1, wherein:

the acquiring sequentially acquires the data in correspondence with displacement along the time axis, the setting sets the computer to the dimensionality investigation mode so that a predetermined number of data sets beginning from a data set which is first acquired by the acquiring are processed in the dimensionality investigation mode, and the clearing clears setting of the dimensionality investigation mode so that data sets following the predetermined number of data sets are processed out of the dimensionality investigation mode.

10. The computer-readable, non-transitory medium according to claim 1, wherein:

the acquiring sequentially acquires the data in correspondence with displacement along the time axis, the setting sets the computer to the dimensionality investigation mode so that data sets which are acquired during a predetermined time after the data is first acquired are processed in the dimensionality investigation mode, and the clearing clears setting of the dimensionality investigation mode so that data sets which are acquired by the data acquisition unit after the predetermined time after the data is first acquired are processed out of the dimensionality investigation mode.

11. The computer-readable, non-transitory medium according to claim 1, wherein:
the acquiring sequentially acquires the data in correspondence with displacement along the time axis,
the setting sets the computer to the dimensionality investigation mode so that a predetermined number of data sets beginning from a certain data set are processed in the dimensionality investigation mode,
the clearing clears setting of the dimensionality investigation mode so that an objective predetermined number of data sets following the predetermined number of data sets are processed out of the dimensionality investigation mode, and
the setting and clearing of the dimensionality investigation mode are thereafter repeated for processing the data alternately in and out of the dimensionality investigation mode.

12. The computer-readable, non-transitory medium according to claim 1, wherein:
the acquiring sequentially acquires the data in correspondence with displacement along the time axis,
the setting sets the computer to the dimensionality investigation mode so that data sets which are acquired by the data acquisition unit during a first predetermined time after acquisition of a certain data set are processed in the dimensionality investigation mode,
the clearing clears setting of the dimensionality investigation mode so that data which are acquired by the data acquisition unit during an objective predetermined time after the elapse of the first predetermined time are processed out of the dimensionality investigation mode, and
the setting and clearing of the dimensionality investigation mode are thereafter repeated so that the data are processed alternately in and out of the dimensionality investigation mode.

13. The computer-readable, non-transitory medium according to claim 1, wherein:
the calculating of the first axial data variation rates obtains the first axial data variation rate corresponding to each of the dimensional axes by calculating an average value per unit time of variation rates of the data in the direction of the dimensional axis,
the comparing compares the calculated first axial data variation rates corresponding to the dimensional axes respectively with the corresponding thresholds,
the calculating of the objective axial data variation rates obtains the objective axial data variation rate corresponding to each of the dimensional axes selected as the objective axes by calculating an average value per unit time of variation rates of data varying with displacement in the direction of the objective dimensional axis, and
the determining of whether to record the data determines whether to record data varying with displacement in a direction of the objective axes, on the basis of the objective axial data variation rates corresponding to the dimensional axes selected as the objective axes.

14. A data recording apparatus for use in simulations, including molecular simulation and global warming simulation, where data varies with time in a space constituted by dimensional axes, the data recording apparatus comprising a processor configured to perform a procedure comprising:
acquiring data varying with displacement in a direction of each of the dimensional axes and time indicated by a time axis, in correspondence with the time axis and each of the dimensional axes;
setting the processor in a dimensionality investigation mode for determining, based on magnitudes of variations of the data in axial directions, one or more objective axes to be one or more objects of investigation as to dimensionality;
calculating an axial data variation rate indicating a rate of variation in the acquired data corresponding to displacement in a direction of each of the dimensional axes and the time axis, while the computer is in the dimensionality investigation mode;
comparing the calculated first axial data variation rates respectively with thresholds corresponding to the dimensional axes and the time axis;
selecting one or more of the dimensional axes and the time axis as one or more objective axes when one or more axial data variation rates corresponding to the one or more of the dimensional axes and the time axis are determined to be equal to or higher than the corresponding thresholds, while rejecting the others of the dimensional axes and the time axis whose corresponding axial data variation rates are determined to be lower than the corresponding threshold;
clearing setting of the dimensionality investigation mode;
calculating an objective axial data variation rate indicating a rate of variation in the acquired data corresponding to displacement in a direction of each of the one or more objective axes, while the processor is out of the dimensionality investigation mode;
determining whether to record data varying with displacement in a direction of the objective axes, based on the calculated objective axial data variation rates; and
recording in a data table the data that is determined to be recorded, and not recording in the data table the data that is determined not to be recorded.

15. A data recording process for use by a computer in simulations, including molecular simulation and global warming simulation, where data varies with time in a space constituted by dimensional axes, the process comprising:
acquiring data varying with displacement in a direction of each of the dimensional axes and time indicated by a time axis, in correspondence with the time axis and each of the dimensional axes;
setting the computer in a dimensionality investigation mode for determining, based on magnitudes of variations of the data in axial directions, one or more objective axes to be one or more objects of investigation as to dimensionality;
calculating an axial data variation rate indicating a rate of variation in the acquired data corresponding to displacement in a direction of each of the dimensional axes and the time axis, while the computer is in the dimensionality investigation mode;
comparing the calculated first axial data variation rates respectively with thresholds corresponding to the dimensional axes and the time axis;
selecting one or more of the dimensional axes and the time axis as one or more objective axes when one or more axial data variation rates corresponding to the one or more of the dimensional axes and the time axis are determined to be equal to or higher than the corresponding thresholds, while rejecting the others of the dimensional axes and the time axis whose corresponding axial data variation rates are determined to be lower than the corresponding thresholds;

clearing setting of the dimensionality investigation mode;

calculating an objective axial data variation rate indicating a rate of variation in the acquired data corresponding to displacement in a direction of each of the one or more objective axes, while the computer is out of the dimensionality investigation mode;

determining whether to record data varying with displacement in a direction of the objective axes, based on the calculated objective axial data variation rates; and recording in a data table the data that is determined to be recorded, and not recording in the data table the data that is determined not to be recorded.

* * * * *